United States Patent
Saidi et al.

(10) Patent No.: US 12,417,471 B2
(45) Date of Patent: Sep. 16, 2025

(54) NETWORKED COMMUNICATION SYSTEM WITH DATA DEOBFUSCATION LAYER

(71) Applicant: Zeta Global Corp., New York, NY (US)

(72) Inventors: Meziane Saidi, Prague (CZ); David Hanzelka, Prague (CZ); Pavan Korada, San Mateo, CA (US)

(73) Assignee: Zeta Global Corp., New York, NY (US)

( * ) Notice: Subject to any disclaimer, the term of this patent is extended or adjusted under 35 U.S.C. 154(b) by 0 days.

(21) Appl. No.: 18/384,853

(22) Filed: Oct. 28, 2023

(65) Prior Publication Data

US 2024/0144319 A1    May 2, 2024

Related U.S. Application Data

(60) Provisional application No. 63/420,290, filed on Oct. 28, 2022.

(51) Int. Cl.
*G06Q 30/0251*  (2023.01)
*G06Q 30/0241*  (2023.01)

(52) U.S. Cl.
CPC ..... *G06Q 30/0254* (2013.01); *G06Q 30/0277* (2013.01)

(58) Field of Classification Search
CPC .............. G06Q 30/0254; G06Q 30/0277
See application file for complete search history.

(56) References Cited

U.S. PATENT DOCUMENTS

| | | | |
|---|---|---|---|
| 11,588,773 B1* | 2/2023 | Brunetti | H04L 51/224 |
| 2011/0055000 A1* | 3/2011 | Zhang | G06Q 30/0244 |
| | | | 705/14.43 |
| 2016/0098745 A1* | 4/2016 | Adams | G06Q 30/0246 |
| | | | 705/14.45 |
| 2021/0044554 A1* | 2/2021 | Toper | H04L 51/212 |

OTHER PUBLICATIONS

Modeling Time to Open of Emails with a Latent State for User Engagement Level Moumita Sinha, Vishwa Vinay, Harvineet Singh (Year: 2019).*

* cited by examiner

*Primary Examiner* — Alexandru Cirnu
(74) *Attorney, Agent, or Firm* — Schwegman Lundberg & Woessner, P.A.

(57) ABSTRACT

The subject technology identifies obfuscated email events received from one or more internet service providers (ISPs). The data deobfuscation layer may identify email messages including obfuscated open events and locations by monitoring the open rates of email messages received by different operating systems, ISPs, and/or device types. The data deobfuscation layer may determine accurate campaign level metrics and/or user open probabilities for batches of email messages having obfuscated events. For example, one or more machine learning models may predict an email open rate for one or more email campaigns and identify the users having the highest probability of generating a true open event. The data deobfuscation layer may be used to improve the performance of email communication networks and/or increase engagement metrics for media campaigns.

20 Claims, 9 Drawing Sheets

NETWORKED COMMUNICATION SYSTEM WITH DATA DEOBFUSCATION LAYER

PRIORITY CLAIM

This patent application claims the benefit of priority, under 35 U.S.C. Section 119(e), to Korada et al, U.S. Provisional Patent Application Ser. No. 63/420,290, entitled "DEOBFUSCATION OF EMAIL DATA," filed on Oct. 28, 2022, which is hereby incorporated by reference in its entirety.

TECHNICAL FIELD

The subject matter disclosed herein generally relates to the technical field of networked communications and, more particularly, to measuring events that occur in conjunction with email distribution.

BACKGROUND

Electronic mail (email) has become an integral part of communications for many industries and organizations. As the infrastructure for email communication has matured, email distributors have relied on tracking events that occur during and after email delivery to determine the performance of email communication networks and how successful email communication campaigns are at reaching a target audience. Events data has flowed freely across email communication networks for years until recently some email service providers have begun restricting the ability of email distributors to accurately track email related events. In some instances, email services providers have intentionally obfuscated event data that originates on their platform to distort the record of events that is returned to the sender.

Restricting the flow of reliable, accurate event data across email communication networks limits the ability of email distributors to identify problems within their email communication networks. Obfuscating event data also increases the number of unwanted emails delivered to user inboxes by reducing the ability of email distributors to determine how engaged audiences are with the email messages they receive. As such, it would be beneficial to detect and correct inaccurate event data distributed over an email communication network.

BRIEF DESCRIPTION OF THE DRAWINGS

Some embodiments are illustrated by way of example and not limitation in the figures of the accompanying drawings.

DETAILED DESCRIPTION

Figure 1:
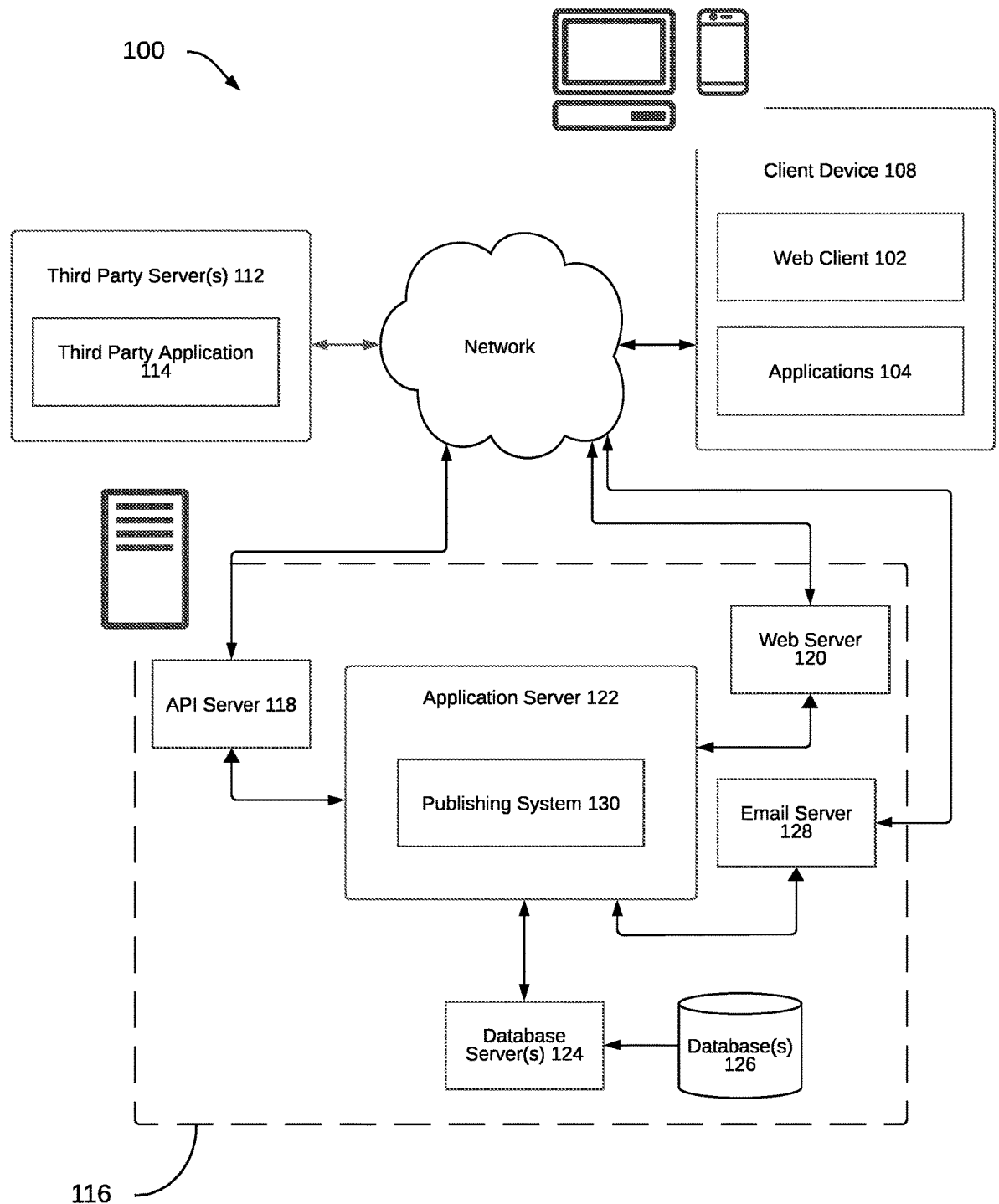
FIG. 1 is a block diagram illustrating a high-level network architecture, according to various embodiments described herein.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In digital publishing, users of a publishing system (e.g., an omnichannel publishing platform) distribute media (e.g., text, image data, video content, audio content, streaming content, extended reality (XR) content including virtual reality (VR) content, augmented reality (AR) content, mixed reality (MR) content and any other form of XR content, and the like) over the Internet or other computer network. Omnichannel publishing platforms enable users to distribute targeted content to specific audiences of users on multiple digital media channels including email, SMS messages, push notifications, linear TV, connected TV, display media (i.e., placements on popular web pages), and the like to support scalable media campaigns. Publishing systems may use multiple communication networks to execute omnichannel campaigns. For example, publishing systems can use a demand side platform (DSP) to publish images, video, and other display media on websites by programmatically bidding on available placements (e.g. portions of webpages, mobile apps, streaming videos, and the like) included in inventory. DSPs may simultaneously execute thousands of media campaigns to enable scalable media publishing capable of reaching millions of users in seconds. For each campaign, DSPs may bid on placements, resolve successful bids, publish media to the procured placements, and process payment in a fraction of a second (e.g., less than 0.1 s, less than 0.01 s, less than 0.001 s, and the like) before a web page, streaming video file, or other online location including the placements loads on a user device.

Publishing systems may also use an email publishing platform to distribute email messages over one or more email communication networks. One or more email servers coupled to the email publishing platform may collect events (e.g., deliveries, bounces, opens, clicks, unsubscribes, and the like) that occur after an email message is sent. The collected events data is processed by the email servers to enable the email publishing platform to monitor the performance of one or more email communication networks handling send emails and determine engagement metrics for email campaigns. The email publishing platform may use multiple email servers to distribute millions of email messages on a daily basis over multiple email communications networks. The email publishing platform may use a curated list of sending domains to maximize the number of the email messages that are delivered to the receipt address inboxes and reduce the number of email messages that are filtered out as spam. For large email campaigns, the email publishing platform may send thousands of email messages and collect events data for each message in a fraction of a second (e.g., less than 0.1 s, less than 0.01 s, less than 0.001 s, and the like) to enable real time tracking of network performance and campaign engagement.

Recently, email service providers have disrupted the flow of events data across email communication networks to email monitoring more difficult. Mail transfer agents (MTAs) or other email servers operated by email service providers obfuscate one or more pieces of event data by, for example, distorting the number of occurrences of a particular event. Without available, accurate events data email publishing platforms are unable to determine network performance or engagement for their email campaigns. To restore the ability of email publishing platforms for monitor email communication networks and email campaigns, the technology recited herein integrates a deobfuscation layer into email communication networks. The deobfuscation layer may identify erroneous events data received from one or more email service providers. The deobfuscation layer may also correct the erroneous events data before it is reported to the email publishing platform to enable the publishing platform may make decisions about ongoing and future email campaigns based on accurate data. In various embodiments, the erroneous events data identified by the deobfuscation layer may include distorted email open rates and incorrect open locations received from one or more third party email servers. The third party email servers may obfuscate true open events and open locations that are reported to the servers in events data received from client email applications running on one or more devices (e.g., smartphones, laptops, tablets, or other computers running an email client application). The third party email servers may obfuscate true open events and open locations by, for example, automatically downloading images and other email message content using a proxy server and reporting the automatic download as an open event from the proxy server's IP address. Automatically downloading every email message, and reporting the download as the equivalent of a download by a client email application running on a user device, generates an open event for every message to create an open rate of 100% and mask the number of true open events generated by users. The obfuscated open events generated by the automatic download include the IP address for the proxy server as location data for the event ensuring each open event has the same location data and masking the location of true open events generated by users.

The deobfuscation layer may include a forensic discriminator that identifies erroneous events data may comparing rates of one or more events to historical baselines. The forensic discriminator may use machine learning to make context aware evaluations that are specific for one or more email service providers reporting the events and/or one or more types of email campaigns. The deobfuscation layer may also include one or more machine learning models that correct erroneous events data by predicting accurate values for the data obfuscated by the third party email server. The deobfuscation layer may predict true open rates and other engagement metric for email campaigns having obfuscated events data. The deobfuscation layer may also predict the users targeted in a campaign that are most likely to generate a true email open event. Predicting the sent events that are most likely to generate open events enables the deobfuscation layer to correct the location data obfuscated by the third party email servers. The predicted true open rates and open locations along with the open probabilities for each targeted user may be reported to the email publishing system to restore the flow of events data and enable accurate email monitoring. The corrected events data may be used by the email publishing system to optimize campaigns that are in progress and improve the performance of future campaigns.

The corrected events data determined by the deobfuscation layer may be used to calculate open rates and other engagement metrics for one or more users. The predicted open rates and other engagement metrics may be added to an identity record associated with the user. Audience segmentation and/or campaign targeting operations may be run on the updated identity records to improve the targeting precision and performance of media campaigns. The deobfuscation layer may also provide more transparency into the performance of email communication networks that include third party email servers that obfuscate email events. For example, third party email servers may obfuscate bounce events and other deliverability metrics to mask their true performance and distort the reputation of sending domains. The deobfuscation layer may identity instances of obfuscated events to audit the performance of email service providers and identity instances of unscrupulous activity by email service providers. The deobfuscation layer may also improve the accuracy and confidence of sending domain reputations by identifying fabricated events that may enhance or diminish the reputation of specific sending domains.

With reference to FIG. 1, an example embodiment of a high-level SaaS network architecture 100 is shown. A networked system 116 provides server-side functionality via a network 110 (e.g., the Internet or WAN) to a client device 108. A web client 102 and a programmatic client, in the example form of a client application 104, are hosted and execute on the client device 108. The networked system 116 includes an application server 122, which in turn hosts a publishing system 130 (such as a DSP or email delivery platform) that provides a number of functions and services to the client application 104 that accesses the networked system 116. The client application 104 also provides a number of user interfaces (UIs) described herein (e.g., campaign configuration UIs, campaign monitoring UIs, reporting UIs, and the like) which can present outputs to a user of the client device 108 and receive inputs thereto in accordance with the methods described herein.

The client device 108 enables a user to access and interact with the networked system 116 and, ultimately, the publishing system 130. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. An email server 128 is also coupled to the application server 122 and provides email communication network interfaces. The email server 128 can be one or more hardware/software components able to communicate email messages to multiple nodes (e.g., receiving domains) hosted by one or more email service providers. Email server 128 can be a mail submission agent, mail transfer agent, mail delivery agent, mail exchange, and the like. Email server 128 includes components or applications described further below. The application server 122 hosts the publishing system 130, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publishing system 130.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions of an email service hosted by a third party (e.g., AOL, Hotmail, Outlook, Apple Mail, Yahoo, Gmail, or another ISP).

Turning now specifically to the applications hosted by the client device 108, the web client 102 may access the various systems (e.g., the publishing system 130) via the web interface supported by the web server 120. Similarly, the client application 104 (e.g., a digital publishing "app") accesses the various services and functions provided by the publishing system 130 via the programmatic interface provided by the API server 118. The client application 104 may be, for example, an "app" executing on the client device 108, such as an iOS or Android OS application, to enable a user to access and input data on the networked system 116 in an offline manner and to perform batch-mode communications between the client application 104 and the networked system 116. The client application 104 may also be a web application or other software application executing on the client device 108.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publishing system 130 could also be implemented as a standalone software program, which does not necessarily have networking capabilities.

Figure 2:
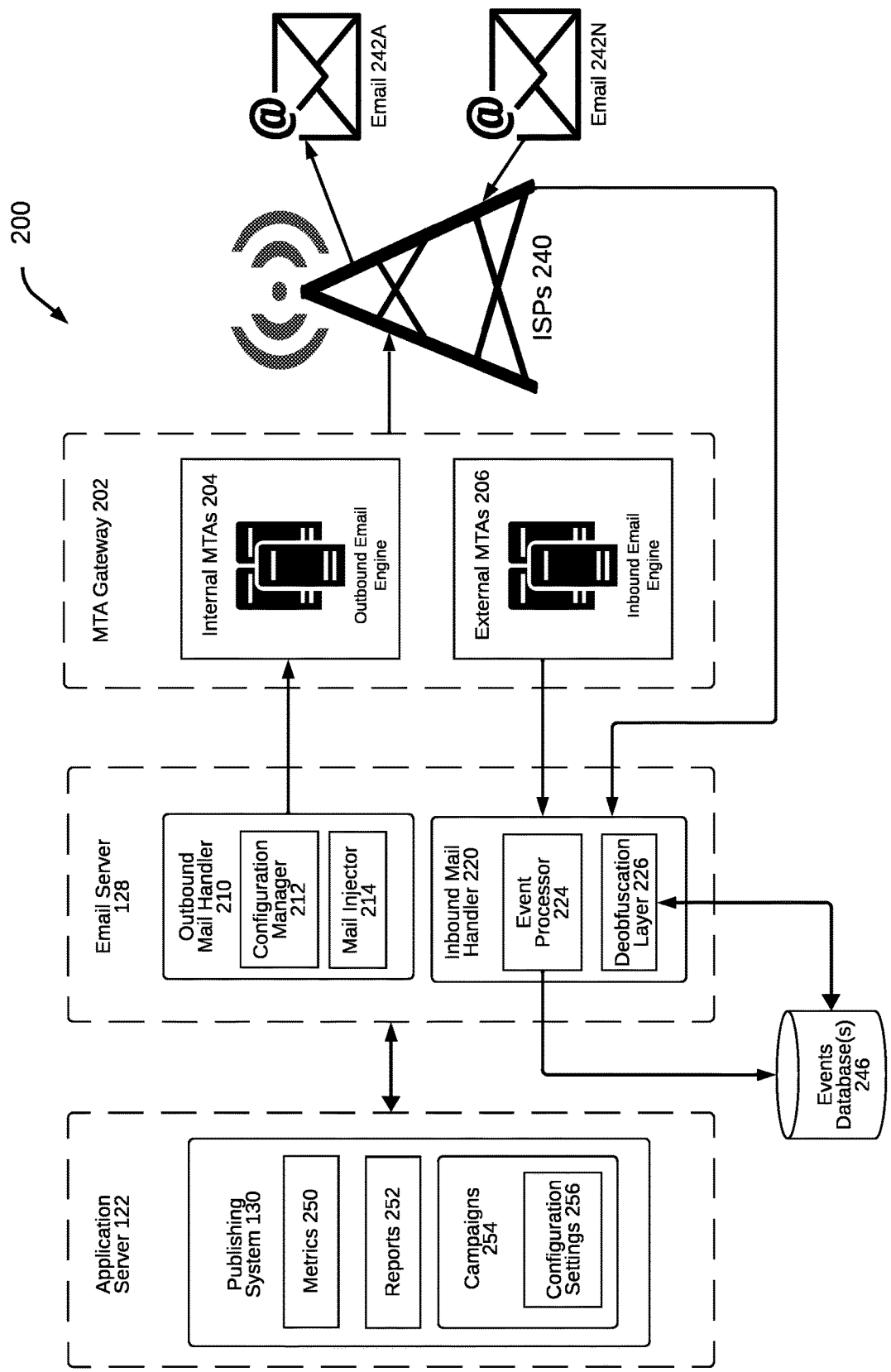
FIG. 2 is a block diagram showing architectural aspects of an email communication network, according to various embodiments described herein.

FIG. 2 is a block diagram illustrating architectural details of an email communication network 200, according to some example embodiments. The email communication network 200 includes an email server 128 coupled to an application server 122 and a mail transfer agent (MTA) gateway 202. In various embodiments, the MTA gateway 202 may be integrated with the email server 128. The MTA gateway 202 may also be included in the email communication network 200 as a standalone component, as shown. The email server 128 may communicate email messages 242A, . . . , 242N to multiple nodes (e.g., email inboxes located at an address include a local portion followed by an email domain) hosted by an internet service provider (ISP) 240 or other email service provider. For example, an ISP 240 can be an email service provider such as AOL, HOTMAIL, OUTLOOK, YAHOO, GMAIL, COMCAST, and the like. The email server 128, MTA gateway 202, internal MTAs 204, external MTAs 206, ISPs 240, and other components of the email communication network 200 may distribute email messages using a standard communication protocol such as simple mail transfer protocol (SMTP).

To communicate email messages 242A, . . . , 242N over the email communication network 200, an outbound message hander 210 included in the email server may build an email campaign based on configuration settings 256 for a campaign 254. For example, a configuration manager 212 of the outbound mail handler 210 may build the email campaign by assembling multiple email messages 242A, . . . , 242N that each include creative (e.g., text, images, video and other content) and a recipient email address specified in the configuration settings 256. A mail injector 214 of the outbound mail handler 210 may determine a sending domain for each of email messages 242A, . . . , 242N and an MTA gateway 202 distribute the email messages 242A, . . . , 242N to one or more internal MTAs 204 according to the sending domains received from the mail injector. For example, the MTA gateway 202 may distribute email messages 242A, . . . , 242N assigned to a particular sending domain to a message queue of the internal MTA 204 that corresponds to the assigned sending domain. For large campaigns, the MTA gateway 202 and the mail injector 214 may coordinate to distribute email messages to different internal MTAs 204 based on the available capacity of each of the internal MTAs 204 and the performance requirements (e.g., speed, timing, message volume, cost, and the like) of each email campaign. Each internal MTA 204 may include an outbound email engine that communicates email messages 242A, . . . , 242N to ISPs 240. The outbound email engine may be implemented as a server cluster that communicates email messages 242A, . . . , 242N to multiple ISPs 240 using SMTP or another standard communications protocol.

To monitor the performance of the email communication network 200 and user engagement with the email messages 242A, . . . , 242N, an inbound mail handler 220 of the email server 128 may listen for events the occur after the email messages 242A, . . . , 242 were communicated to the ISP 240. The inbound mail handler 220 may include an event processor 224 that listens for events received from the external MTAs 206 and the ISPs. Events received external MTAs 206 may include failure events and hard bounce events that indicate the email message 242A was not delivered because, for example, the recipient email address does not exist. one of the delivery components of the ISP 240 malfunctioned, and the like. Events received from the ISPs may include bounce events that indicate the email message 242A was not delivered and engagement events such as clicks, opens, unsubscribes, and replies. Each of the events received by the event processor may include event metadata that includes additional information about each event. The event and event metadata received by the event processor 224 may be stored as event data in an events database 246. The event processor 224 may access the events database 246 to retrieve event data and calculate one or more metrics 250 (e.g., click rate, delivery rate, bounce rate, and the like) for email campaigns based on the events data.

In various embodiments, the event processor 224 may determine one or more metrics 250 in real time to evaluate the performance of email campaigns that are running on the email communication network 200. The event processor 224 may communicate the real time metrics 250 to the publishing system 130 and/or outbound mail handler so that the email campaigns may be optimized dynamically based on performance. For example, the internal MTA assigned to distribute messages may be changed by the mail injector based on a real time delivery rate is below a desired, predetermined deliverability threshold. In another example, the list of receipt addresses included in the configuration settings 256 may be updated dynamically based on a real time click rate that is below a desired, predetermined engagement threshold.

The inbound mail handler 220 may also include a deobfuscation layer 226 that may evaluate events received by the events processor 224 based on event data included in the events database 246. For example, the deobfuscation layer 226 may identify events and/or event metadata that has been obfuscated by ISPs 240. The deobfuscation layer 226 may also identify event data that has been distorted by the obfuscated events and/or event metadata. Deobfuscation layer 226 may also use one or more machine learning models to predict true events and/or event metadata for each of the obfuscated events and metadata, respectively. The deobfuscation layer 226 may also use one or more machine learning models to predict true event data for each piece of distorted event data. The predicted event data may be used to calculate accurate metrics 250 for email campaigns and determine specific users that are most likely to generate each of the predicted true events. The predicted metrics, events, and event metadata may included in one or more reports 252 (e.g., deobfuscated deliverability reports, deobfuscated engagement reports) that are displayed by the publishing system 130 on a client device running an instance of a client application provided by the application server 122. The predicted event data, metrics, events, and event metadata may also be displayed in one or more user interfaces provided by the publishing system so that users may use the predicted data to configure and optimize media campaigns running on the publishing system 130. For example, the predicted engagement rates for an audience of users targeted in an email campaign may be used to determine an intent signal that may result in including one or more members of the email campaign audience in a media campaign that will run on a DSP.

In one implementation, a demand side portal of the DSP may target specific users predicted to generate an open event for the email campaign in a display media campaign by matching an identifier (e.g., an email address) for the users having the predicted open events to an identifier (e.g., a cookie) included in bidstream data provided by a supply side portal of the DSP. The bidstream data may be received from a content publisher (e.g., an app, website, and the like) and may include data about the content placement including the publisher, URL, device type, placement format, IP address, cookie, location data, demographic data, and the like for one or more placements available at a specified domain or location on a publication network (e.g., the Internet). To target users having predicted open events, the demand side portal may access one or more identity records in an identity cloud available to the publication system 130 to identify one or more cookies included in the same identity record as the email address for each user having a predicted open event. The cookies included in the identity records may be matched to cookies in the bidstream data and the demand side portal may bid one and publish content at the obtained placements having a matched cookie to ensure the content will be viewed by the targeted users for the original email campaign.

To procure placements, the DSP may include a bidding exchange that is communicatively coupled to the demand side portal and the supply side portal. The bidding exchange may present user interfaces enabling receipt of bids from a brand or other media provider for placement of media by a publisher at a specified location or domain in available inventory on the publication network. In some examples, the publishing system 130 may be configured to present content to a user at the specified location or domain on the publication network based on configuration settings 256 for campaigns 254. For example, the demand side portal may be configured to reserve, upon resolving of a successful bid from the media provider, the specified location or domain for placement of a piece of content. The demand side portal may then publish the piece of content specified by the configuration settings 256 for the campaign 254 at the reserved placements. Accordingly, users accessing the locations including the reserved placements may view and engage with the media. In some examples, the publishing system 130 is further configured to process a transaction between the media provider and the publisher based on a display and/or a viewing of the targeted content by the user or third party.

It should be understood that the process for bidding for placement of content at a specified location or domain and the process for providing the targeted content for display may be partially or completely programmatic. For example, a demand side API or other logic included in the demand side portal may programmatically bid on media placements, resolve successful bids to reserve placements, and publish media at the reserved placements programmatically in a faction of a second to simultaneously support multiple, large display media campaigns.

In various embodiments, the publication system 130 may publish content based on the configuration settings 256 for campaigns 254. For example, the configuration settings 256 may include budgeting and/or targeting parameters that specify which users to target and the channels to use to reach each audience of users. The event processor 224 of the email server 128 may track email campaign performance in real time by determining event data based on events received from the ISPs 240 and external MTAs 206. For example, the event processor 224 may determine a the number of email messages delivered, a number of email messages viewed, a number of email messages opened, a number of clicks, conversions, responses, and other interactions with the email messages 242A, . . . , 242 distributed in an email campaign. The configuration manager 212 and or the publishing system 130 may dynamically update the configuration settings 256 based on the campaign performance to optimize the performance of the email campaign and increase the likelihood the campaign will achieve one or more predefined goals.

For example, the configuration manager 212 may adjust the delivery cadence of email messages in a campaign based on observed open rates for messages send at different cadences. To update the delivery cadence, the configuration manager 212 may update the configuration settings 256 to adjust the re-delivery rate for each email address included in the campaign 254. For example, the re-delivery rate for a particular email address may be changed from three days to five days in response to the event processor 224 determining a higher open rate for messages delivered five days after an initial open event relative to messages delivered three days after an initial open event. In an another example, configuration settings 256 for other campaigns running on the publishing system 130 may be adjusted based one or more campaign performance metrics determined by the event processor. For example, the configuration settings 256 for a display media campaign 254 may be adjusted to target users having high conversation rates in email campaigns. To target users with high conversation rates, the configuration settings 256 may be adjusted to increase the bid amounts for content placements having cookies in the bidstream data that are associated with an email address or other identifier for users having observed conversion events in an email campaign. The configuration settings 256 may also be adjusted to increase the bid amount for content placements having demographic information (e.g., women ages 25-35) in the bidstream data that matches the demographic information of a segment of users having a high conversation rate in an email campaign.

In various embodiments, the publishing system 130 may use the event data collected by event processor 224 to enrich identity records stored in an identity graph, data cloud or other database available to the publishing system 130. The identity records may each include one or more identifiers (e.g., email address, IP address, device identifier, and the like) associated with a particular user. To enrich the identity record for each user targeted in an email campaign based on observed event data, the publishing system 130 may resolve an identity for each user targeted in an email campaign by matching the email address or other identifier for the user with an email address stored in an identity record. In various embodiments, one or more of the identifiers may be encrypted and the encrypted identifiers may be matched to locate the identity record for a user. For example, email addresses may be encrypted using an MD5 hash or other encryption algorithm and the email md5 address may be matched during identity resolution.

Each identity record may include location data (e.g., a zip code, street address, or other known geographic location for the user), one or more intender attributes, and other user attributes. The intender attributes may include individual metrics that may be used to determine an intent of a user to purchase a product, visit a store, view an ad, or perform another action. For example, the intender attributes may include demographic information and other user data as well as individual level brand propensities (e.g., a tendency of the user to shop at store of a particular brand, purchase a particular brand of athletic shoes or other goods, consume content on YouTube or another particular media publisher by a particular band, and the like), brand affinity scores (e.g., metrics that describe how frequently and/or consistently users engage with particular brands, for example, how often users purchase products made by the brand, click or view ads or emails sent by the brand, visit a particular brand website, and the like), product propensities (e.g., the types of products or services users frequently and/or consistently buy or show interest in), and the like. The intender attributes may also include semantic codes (e.g., key words or important terms) summarizing the content of web pages and other digital media browsed by users. The intender attributes may also include an attitude or behavioral propensity (e.g., materialistic, athletic, health conscious, frugal, aggressive, or other personality trait) or a channel propensity (e.g., email, web page display, mobile ad, connected tv media, or other marketing channel preferred by a user).

The user attributes may also include opens, clicks, replies, conversations, and other events recorded by the events processor 224. The events observed for each email campaign may be added to the user attributes stored in the identity profile for each user targeted in an email campaign to update the user attributes. The updated user attributes may be used to adjust the intender attributes to ensure the intender signals for each user are based on the user's most recent preferences and tendencies. IP addresses and other event metadata for email events may also be added to the identity profiles to provide location data and other context for each event that may be used to further refine the targeting parameters and other configuration settings 256 for campaigns 254. For example, intender attributes determined using the updated event data may that identify particular brands, products, types of content, and marketing channels that resonate most with a particular segment of users (e.g., users within a particular age range or other demographic, users located in a particular geographic area, and the like). The updated intender attributes may be displayed to users in one or more the campaign configuration UIs provided by the publishing system 130. The updated intender attributes may also be added to configuration settings 256 as targeting parameters used to identify users that should receive content distributed in campaigns 254. For example, the targeting parameters may be used to identity users that frequently engage with content and/or are likely to purchase products included in the content of the campaigns 254 running on the publishing system 130.

Figure 3:
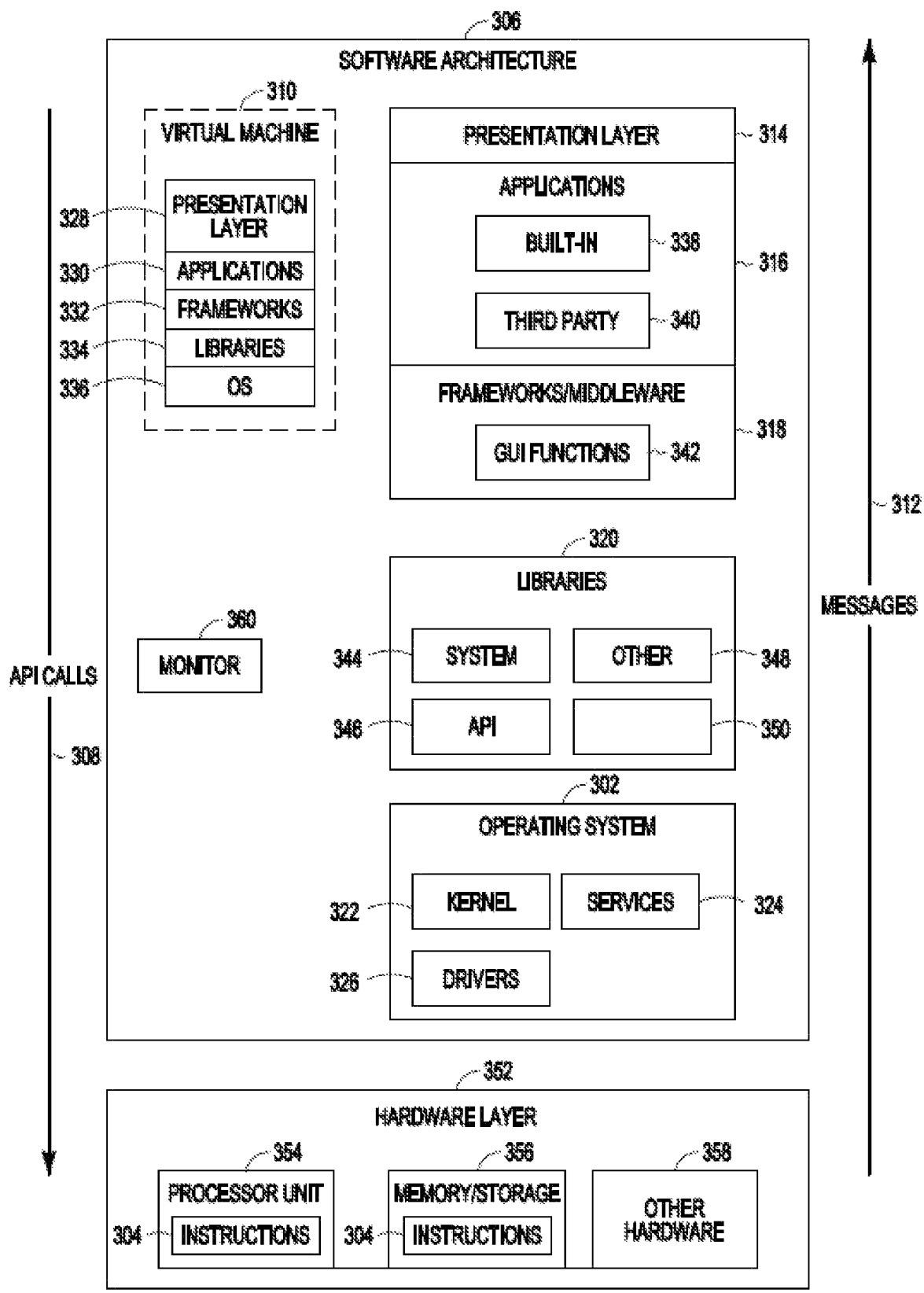
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
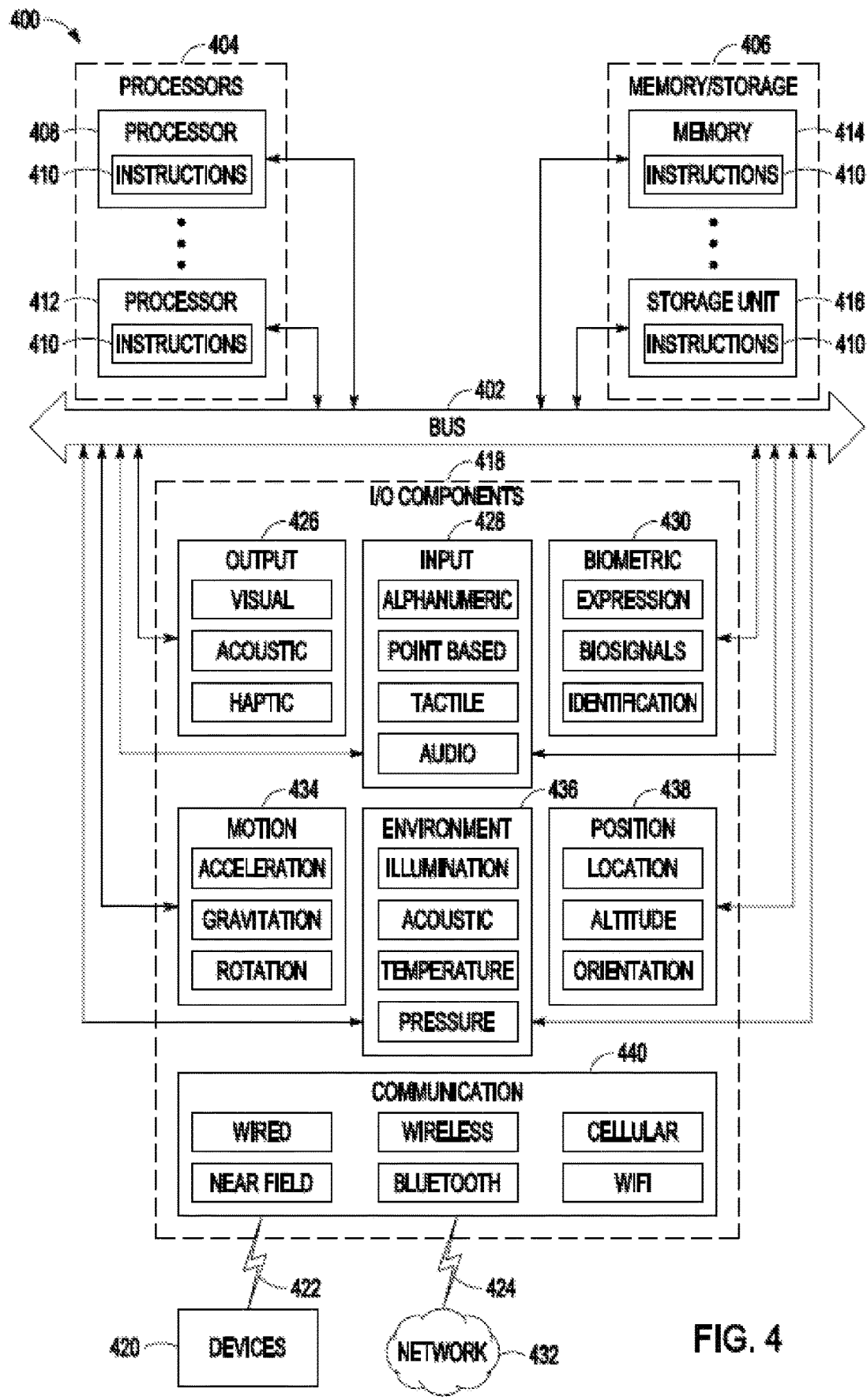
FIG. 4 is a block diagram illustrating components of a machine, according to various embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Some examples provide an email communication network that includes a deobfuscation layer that identifies erroneous events received from ISPs. The deobfuscation layer may also predict true events and event metadata. The deobfuscation layer may also predict one or more performance metrics, engagement metrics, or other event data to correct event data distorted by the erroneous events. The predicted events, event metadata, and event data may be used by an email server to optimize one or more email campaigns. The predicted events, event metadata, and event data may also be used by a publishing system to optimize media campaign configuration settings for email campaigns, display media campaigns, and other campaigns running on the publication system. The deobfuscation layer may improve the functionality of email communication networks by monitoring the performance of ISPs and other network components to identify problems that effect email deliverability more rapidly. The deobfuscation layer may also circumvent efforts by ISPs or nefarious third parties to restrict the free flow of event data across email communication networks by identifying erroneous events and correcting distorted event data. Predicted true events, event metadata, and event data determined by the deobfuscation layer may be used to improve the functionality of publishing systems, email delivery platforms, DSPs and other networked systems used to publish digital media by increasing the likelihood media campaigns will be successful (e.g., meet one or more predefined engagement, conversion, revenue, or other goals) and decreasing the amount of computational resources (e.g., processor, memory, network, and the like) wasted on running unsuccessful campaigns.

Compared with previous email communication networks that communicate obfuscated events and event metadata and report erroneous event data, the email communication network described herein uses machine learning to identify obfuscated events and event metadata that predict true event data. The deobfuscation layer of the email communication network may use neural networks, random forest models, and other machine learning models that consider multiple event and campaign features when predicting event data (e.g., true delivery rates, open rates, click rates, and the like) and determining true events (e.g., predicting true events based on the individual event generation probability for each user in a campaign audience) and event metadata. The machine learning models may evaluate multiple event and/or campaign features jointly to learn how each individual user included in a campaign audience interacts with different types of email campaigns. The user specific insights determined by the machine learning models data may be used to improve engagement metrics (e.g., open rate, click rate, conversion rate, and the like) and one or more performance KPIs for campaigns.

Figure 5:
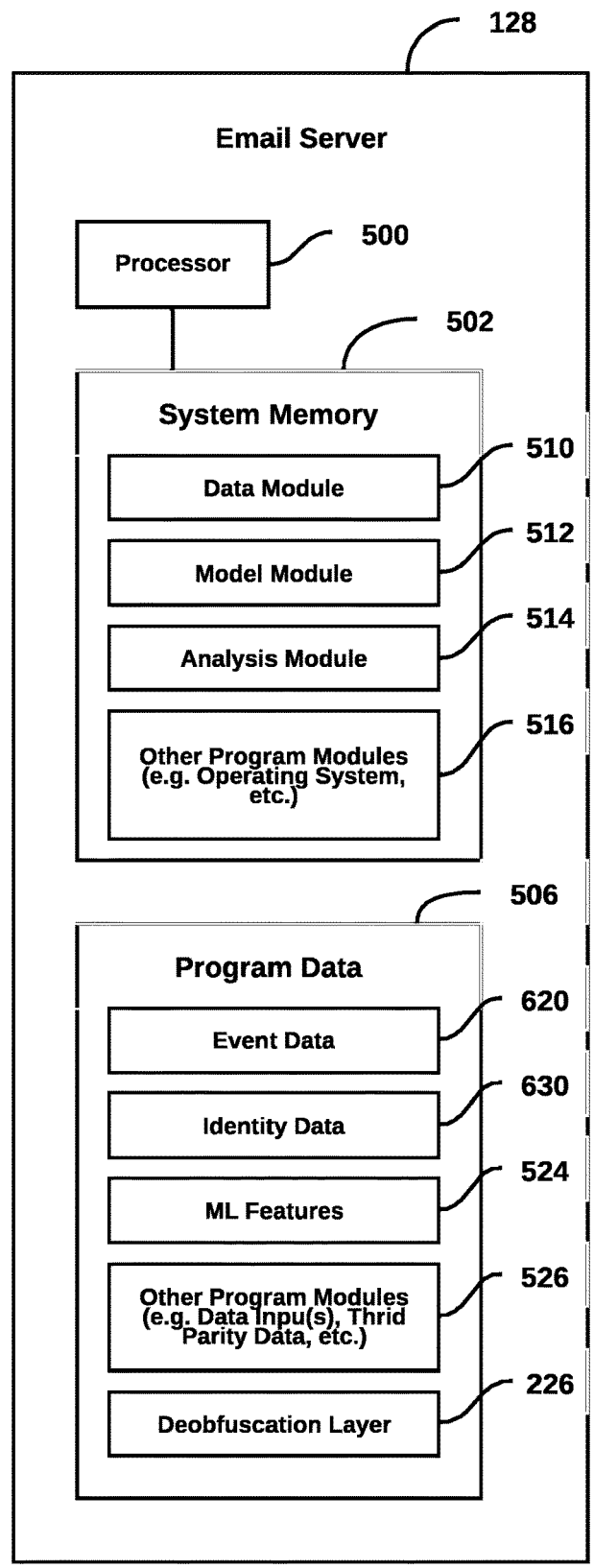
FIG. 5 depicts aspects of an email server, according to various embodiments described herein.

FIG. 5 illustrates an embodiment of a email server 128 that may be used to implement the deobfuscation layer. The email server 128 may include at least one processor 500 coupled to a system memory 502. The system memory 502 may include computer program modules and program data 508. In this implementation, program modules may include a data module 510, a model module 512, an analysis module 514, and other program modules 516 such as an operating system, device drivers, and so forth. Each module 510 through 516 may include a respective set of computer-program instructions executable by one or more processors 500.

This is one example of a set of program modules, and other numbers and arrangements of program modules are contemplated as a function of the particular design and/or architecture of the email server 128. Additionally, although shown as a single email server 128, the operations associated with respective computer-program instructions in the program modules could be distributed across multiple computing devices. Program data 508 may include event data 620, identity data 630, machine learning (ML) features 524, and other program data 526 such as data input(s), third-party data, and/or others. In some examples, the email server 128 includes a deobfuscation layer 226, described further below.

Figure 6:
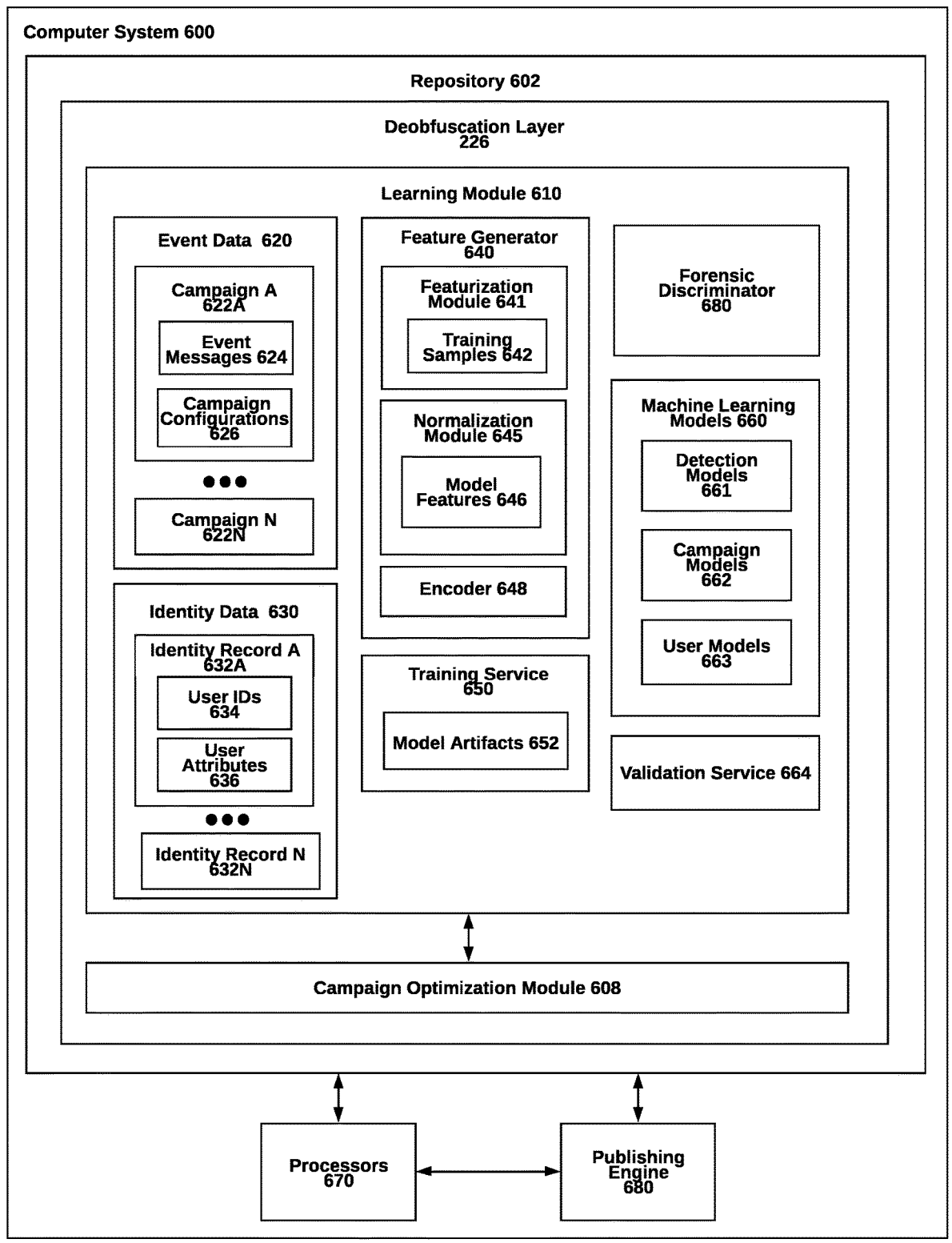
FIG. 6 depicts aspects of a data deobfuscation layer, according to various embodiments described herein.

FIG. 6 is a block diagram illustrating more details of the deobfuscation layer 226. In various embodiments, the deobfuscation layer 226 may include a learning module 610 that identifies obfuscated events and predicts true events and event metadata. The learning module 610 may also predict one or more metrics using the true events and event metadata. The deobfuscation layer 226 may also include a campaign optimization module 608 that may send messages to ISPs and publication systems connected to an email server implementing the deobfuscation layer 226 to improve the performance of email communication networks and/or one or more media campaigns (e.g., email campaigns, display media campaigns, and the like). The deobfuscation layer 226 may be implemented using a computer system 600. In various embodiments, the computer system 600 may include a repository 602, a publishing engine 690, and one or more computer processors 670. In one or more embodiments, the computer system 600 takes the form of the email server described above in FIG. 2 or takes the form of any other computer device including a processor and memory. In one or more embodiments, the computer processor(s) 670 takes the form of the processor 500 described in FIG. 5. In one or more embodiments, the publishing engine 690 may interface with the publishing system 130 described in FIG. 2, email communication network, DSP, and/or other networked communication system to run media campaigns.

In one or more embodiments, the repository 602 may be any type of storage unit and/or device (e.g., a file system, database, collection of tables, or any other storage mechanism) for storing data. Further, the repository 602 may include multiple different storage units and/or devices. The multiple different storage units and/or devices may or may not be of the same type or located at the same physical site. The repository 602 may include a deobfuscation layer 226.

The learning module 610 may include a forensic discriminator 680 that identifies obfuscated events received from one or more ISPs. The learning module 610 may also include one or more machine learning models 660 that are used to deobfuscate email events and event data by predicting true events and accurate event data. For example, the machine learning models 660 may include one or more campaign models 662 that determine one or more campaign level metrics. For example, the campaign models 662 may determine a true delivery rate, open rate, click rate, conversion rate, and/or one or more other metrics for email campaigns that have obfuscated events. The machine learning models 660 may also include one or more user models 663 that may determine true events by predicting a likelihood that one or more individual users targeted in a campaign will generate an event. For example, the user models 663 may determine the probability a user will generate a true bounce event, delivery event, display event, open event, click event, unsubscribe event, reply event, and the like.

A training service 650 may train one or more of the machine learning models 660 and/or one or more models included in the forensic discriminator 680 using training datasets that include one or more model features (e.g., encoded vectors) that are determined by a feature generator 640. The model features may be calculated using event data 620 for one or more email campaigns and/or identity data 630 for one or more users targeted in email campaigns. Event data 620 may include event messages 624 and campaign configurations 626 for email campaigns 622A, ..., 622N communicating emails using an email communication network. The event messages 624 may be received from, for example, one or more ISPs in response to email messages communicated to the ISPs by one or more MTAs (e.g., internal MTAs). The event messages 624 may include an event type, for example, a bounce event and/or failure event generated when an error occurs that prevents and/or impacts the delivery of the email message. Other event types may include engagement events for example, display events, open events, click events, unsubscribe events, and reply events, that occur when an user and/or client device interacts with an email message by, for example, displaying an email, opening an email, clicking on an email, replying to an email, unsubscribing from an email campaign, and the like.

Event messages 624 may also include event metadata that provides additional information about the events. For example, event metadata may include device data (e.g., device ID, operating system, IP address, email provider, and the like) associated with a device (e.g., smartphone, personal computer, email server, and the like) receiving the email message and/or a user identifier (e.g., email address, cookie ID, or other unique identifier) associated with the user receiving the email message. Event metadata may also include a campaign ID that identities the campaign that originated the email message and/or time stamp data that indicates, for example, when an event occurred, when an event message was sent, when an event message was received, and the like. The campaign ID included in the event metadata may be used to identity an email campaign that sent the email message that originated the event. The learning module 610 may aggregate the event messages 624 received for the emails sent in each of the campaigns 622A, ..., 622N to determine campaign level metrics that may be used to evaluate the performance of an email communication network and determine amount of audience engagement for specific campaigns 622A, ..., 622N. The campaign level metrics may be stored as event data 620.

The learning module 610 may also use the campaign ID to retrieve one or more campaign configurations 626 from the publication system. The campaign configurations 626 may include for example a client ID, campaign type, campaign size, subject matter of the content distributed in the campaign, campaign duration, budgeting parameters, targeting parameters, and the like. The learning module 610 may also use the user identifier included in the event metadata to retrieve identity data 630 for one or more users targeted in the email campaigns 622A, . . . , 622N. For example, the learning module 610 may access an identity graph, data cloud, customer data platform (CDP), or other database or data store to retrieve identity records 632A, . . . , 632N for one or more targeted users. To retrieve the identity records 632A, . . . , 632N, the learning module 610 may locate an identity record 632A for each targeted user by matching the user identifier to one or more user ids 634 (e.g., an email address, postal address, cookie ID, device ID, user ID, and the like) included in the identity record 632A. The identity records 632A, . . . , 632N may include the user ids 634 and one or more user attributes 636 that provide more information about the user. For example, the user attributes 636 may include social and/or demographic characteristics (e.g., location, race, ethnicity, income, age, gender, and the like) and engagement histories that list the engagement actions (e.g., views, opens, clicks, replies, unsubscribes, conversions, and the like) attributed to the user. The engagement histories may be derived from multiple data sources including engagement events observed on one or more pieces of pixeled media and/or webpages. Engagement histories may also be derived from transaction events received from a brand's first party data, credit card transaction records, banking records, and/or other available datasets of engagement and transaction events. The user attributes 636 may also include web traffic data that includes specific web pages accessed by a user and a classification for each web page (e.g., a code that describes the type of content included on the web page). The user attributes 636 may also include one or more scores that are generated by one or more machine learning models based on patterns observed in a user's social/demographic characteristics, engagement history, and/or web traffic data. For example, user attributes 636 may include one or more persona scores and/or topic scores that indicate a level of similarity the user has to other users that have particular personality traits and/or topics of interest. The user attributes 636 may also include behavioral propensity scores that indicate a probability the user will have a specific behavior (e.g., search for airline tickets or perform another specific online action). The user attributes may also include product affinity scores and/or brand affinity scores that indicate a probability the user will engage with content related to a specific product or brand.

The feature generator 640 may assemble training datasets that include model features 646 calculated from event data 620 and identity data 630. For example, the feature generator 640 may assemble training datasets including model features 646 derived from event messages 624 and campaign configurations 626 to train one or more detection models 661 of the forensic discriminator 680 (e.g., an obfuscated event detection model 661 that identifies obfuscated events received from an ISP). Different sets of model features 646 derived from the event messages 624 and campaign configurations 626 may be used to train one or more campaign models 662 (e.g., an open rate model that predicts an open rate for campaigns having obfuscated events). The feature generator 640 may also assemble training datasets including model features 646 derived from event messages 624, campaign configurations 626, and identity data 630 to train one or more user models 663 (e.g., an engagement model that predicts a likelihood a user targeted in an email campaign generated a true open event).

The featurization module 641 may perform extract, transform, and load (ETL) tasks to extract training samples 642 that are used to derive the model features 646. The ETL jobs may group event data 620 and identity data 630 by campaign and may filter the event data 620 and identity data 630 to retrieve a training sample 642 that is used to calculate the model features 646. For example, the featurization module 641 may extract a training sample 642 that includes campaign configurations 626 and event messages 624 for multiple campaigns 622A, . . . , 622N. The featurization model may also calculate one or more campaign level metrics for the campaigns 622A, . . . , 622N based on the retrieved event messages 622. For example, the featurization module 641 may determine an email open rate, email click rate, email delivery rate, email bounce rate, email reply rate, and the like for each of the campaigns 622A, . . . , 622N.

The campaign level metrics may be calculated based the events and event metadata included in the event messages 624 for each campaign 622A, . . . , 622N. To determine campaign level metrics, the event messages 624 for each campaign may be grouped together based on a campaign ID that may be included in the event metadata for each event message 624. The featurization module 641 may group event messages 624 having the same campaign ID together to identify events that were originated by the same campaign. The featurization module 641 may also aggregate event messages 624 using the event type and/or other pieces of event metadata. For example, the featurization module 641 may aggregate event messages 624 for open events by campaign ID, operating system, device ID, IP address, ISP, email service provider, and the like to determine the number of the event messages of a certain type that are associated with a specific campaign, device, ID, IP address, ISP, email serviced provider, and the like. The featurization module 641 may then determine campaign level metrics for the aggregated segments of event messages. For example, the featurization module 641 may determine delivery rates, bounce rates, open rates, click rates, average times between open and click events, and the like for segments of email messages that were, for example, delivered by a particular ISP (e.g., iOS mail, Yahoo, Hotmail Google Workspace, Gmail, Outlook, Microsoft Exchange, and the like) and/or received by devices having a particular operating system. The campaign level metrics may be stored in event data 620 so that they may be included in training samples 642.

The featurization module 641 may filter event messages 624 using the event type and/or one or more pieces of event metadata to retrieve training samples 642 that include specific segments of event messages and/or one or more campaign level metrics for the event message segments. For example, to generate a training sample 642 used to train a detection model 661 of the forensic discriminator 680, the featurization module 641 may filter the event messages 624 by campaign ID operating system, device ID, ISP, and the like to identify a segment of event messages received from a particular ISP. The featurization module 641 may determine campaign level metrics including, for example, the number of email messages sent, the number of email messages opened, the number of email messages clicked, open rates, click rates, and the like for the segment of email messages received from a specific ISP.

The featurization module 641 may also determine the campaign type for each of the campaigns 622A, . . . , 622N using a clustering process that groups similar campaigns together based on campaign configurations 626 (e.g., client ID, campaign type, campaign size, subject matter of the content distributed in the campaign, campaign duration, budgeting parameters, targeting parameters, industry of the client running the campaign, a campaign content type (e.g., informational, newsletter, promotional, discount offer, etc.), campaign active dates, campaign content distribution intervals, and the like). The campaign type determined for each of the campaigns 622A, ..., 622N may be stored in event data 620 so that the campaign type may be included in the training sample 642. The featurization module 641 may filter the event data 620 by campaign type to retrieve training samples 642 that are used to the one or more machine learning models 660. For example, the featurization module 641 may retrieve a training sample 642 that includes event messages, event metadata, campaign configurations, and campaign level metrics for campaigns 622A, ..., 622N having an "athletic shoe brand" campaign type, a "luxury brand targeting men aged 25-35" campaign type, and one or more other campaign types that describe the type of subject matter included in the campaign content and/or target audience of the campaigns 622A, ..., 622N.

The ETL jobs performed by the featurization module 641 may also assemble training samples 642 including one or more pieces of identity data 630. For example, the featurization module 641 may assemble training samples 642 that include user attributes for users targeted in one or more email campaigns 622A, ..., 622N. The featurization module 641 may determine the users targeted in a campaign 622A by matching a user identifier (e.g., email address) included in the event metadata of the event messages 624 and/or targeting parameters of the campaign configurations 626 with one or more user ids 634 included in an identity record 632A. The featurization module 641 may filter the identity data 630 using the matched user identifier to assemble a training sample 642 that includes the identity records 632A, ..., 632N of the users targeted in a campaign 622A. The featurization module 641 may also filter the identity data 630 using one or more of the user attributes 636 to assemble training samples 642 that include identity records 632A, ..., 632N for similar users (e.g., users ages 25-35, users located in Los Angeles, CA, users that have recently viewed athletic shoes, and the like).

The featurization module 641 may also determine one or more engagement metrics based on the engagement histories included in the identity records 632A, ..., 632N. For example, the featurization module 641 may calculate the ratio of email open events to email delivery events to determine an open rate for the user. The featurization module 641 may also calculate the ratio of email click events and/or conversion events to email delivery events to determine a click through rate and/or conversion rate, respectively. The engagement metrics may be added to the identity records 632A, ..., 632N and the featurization module may filter the identity data 630 based on the engagement metrics to assemble training samples 642 that include identity records 632A, ..., 632N for segments of users having similar engagement profiles (e.g., similar click through rates, open rates, conversion rates, and the like). The featurization module 641 may also events included in the engagement histories by a campaign ID to extract the events associated with a particular campaign and determine campaign specific engagement metrics. The campaign specific engagement metrics may be added to the identity records 632A, ..., 632N so that the featurization module 641 may assemble training datasets that include identity records 632A, ..., 632N for users that have similar engagement profiles for similar campaigns (e.g., campaigns having the same campaign type, campaigns with similar campaign configurations, and the like).

A normalization module 645 may standardize the pieces of data included in the training sample 642 to generate model features 646 that may be used to train the machine learning models 660 more efficiently. The normalization process performed by the normalization module 645 may include operations that may encode qualitative features (e.g., user attributes 636, campaign configurations 626, and the like) into numerical representations that may be evaluated by the machine learning models 660 in combination with other quantitative features (e.g., open rates, click rates, and the like). The normalization module 645 may also normalize the data included in the training samples 642 by converting the values for each of the pieces of data in the training samples 642 to a scaled value within a predetermined numerical range (e.g., between 0 and 1) For example, open rates and other engagement metrics (e.g., 0.21 for user A) and the average time between email sent events and email open/click events (12.2 hours for user A) may be normalized by the normalization module 645 to place both values on the same scale (e.g., a scale centered at zero with a standard deviation of 1). The normalization process performed by the normalization module 645 prevents features with a larger absolute values (e.g., 12.2 hours) from having more importance to the model than features with smaller absolute values (e.g., an open ratio of 0.21).

The normalization module 645 may also perform a binning process to group together categories of features that behave similarly towards the prediction target. For example, campaign metrics including open rates for email messages in a particular campaign that were sent to users having the Yahoo ISP and open rates for users in the same campaign that use the Hotmail ISP may be binned together if they are similar. To bin similar features, the normalization module 645 may compare features included in the same feature category (e.g., campaign email open rates for various email servers, campaign types, campaign email click rates for various email servers, user email open rates for various campaigns, user email open rates for various email servers, user click rates for various campaigns, and the like) to a binning threshold (e.g., +/−10% of the lowest feature value, within 1 standard deviation of the highest feature value, and the like). Features that are within the binning threshold may be combined into one feature, averaged, or otherwise grouped together to make the model more general and prevent overfitting. Features that exceed the binning threshold may be treated as independent features during the model training process.

An encoder 648 may encode the model features 646 determined for each training sample 642 to calculate an encoded vector that is representative of at portion of the event data 620 for a campaign 622A and/or a portion of the identity data 630 of the users targeted by the campaign 622A. A training service 650 may aggregate the encoded vectors calculated for one or more training samples 642 into training datasets that are used to train the machine learning models 660.

The training service 650 perform training routines to determine model artifacts 652 for one or more machine learning models 660. The model artifacts 652 may include trained weights for one or more neural networks determined by training the neural networks on the model features 646 and/or encoded vectors generated by the feature generator 640. The model artifacts may also include branches of one or more decision tree models and the decision coefficients for each branch determined based on the training samples and/or model features 646 generated by the feature generator 640. The model artifacts 652 may also include one or more model coefficients of an economic model determined from one or more pieces of data included in the training samples 642.

The model coefficients may include campaign level metrics (e.g., open rates, click rates, conversion rates, average time between sent and open events, average time between open and click events, average time between open and conversion events, and the like) for specific segments of event data 620. For example, the model coefficients for the detection models may include campaign level metrics for segments of event messages 624 generated by a particular device (e.g., devices having iOS, Mac OSX, Android, Windows, and/or another type of operating system) and/or received from a particular ISP. For example, the training service 650 may determine an average daily open rate for email messages sent to devices having an iOS, Mac OSX, or other Apple operating system by calculating the ratio of open events to delivered events received for the segment of event data 620 having event metadata that includes an Apple operating system and time stamp data within a predefined 24 hour period. The training service 650 may also determine an average daily open rate for email messages sent to devices having a Windows or Android operating system based on the ratio of open events to delivered events received for a segment of event data having metadata that includes a Windows and/or Android operating system and time stamp data within a predefined 24 hour period. The average daily open rates for the segment of event data having Apple operating systems and the segment of event data having Windows or Android operating systems may be calculated for each ISP (e.g., Yahoo!, Gmail, Outlook, Hotmail, Apple mail, and the like) to calculate additional ISP specific model coefficients. The training service 650 may also determine an average daily click to open ratio for email messages sent to devices having an iOS, Mac OSX, or other Apple operating system by determining the ratio email click events to email open events for the segment of event data 620 having an Apple operating system included in event metadata.

The economic models may use the model coefficients determined by the training service 650 has one or more thresholds used to generate a prediction. For example, a detection model 661 of the forensic discriminator 680 may identify obfuscated events by comparing the open rate of a sample of email messages sent to an ISP to an historical open rate threshold for the ISP. If the open rate for the sample exceeds the historical open rate threshold by a predetermined amount (e.g, a percent different of 20%, more than one standard deviation, and the like) the detection model 661 may determine the open event for the sample are obfuscated.

In various embodiments, the detection models 661 may identity obfuscated email events based on one or more campaign level metrics for campaigns 622A, . . . , 622N having event messages 624 one or more pieces of event metadata. For example, the detection models 661 may identify the operating system, ISP, and/or device type for each event message in a target sample. The detection models 661 may determine a historical open rate for a particular operating system, ISP, and/or device type by determining the ratio of open events to delivered events observed for a segment of email messages from one or more previously completed campaigns that were received by the particular operating system, ISP, and/or device type. The historical open rate may be determined for a predetermined number of completed campaigns and/or over a predetermined time period. For example, the historical open rate may be a daily open rate, monthly open rate, open rate for a currently running campaigns, average open rate for one or more historical campaigns, and the like. The historical open rates may be determined periodically (e.g., every day, every week, every month, and the like) and compared over time to determine a rate of change in the open rate for a particular operating system, ISP, and/or device type.

The detection model 661 may identify obfuscated email events based the rate of change in the open rate determined for a currently running email campaign. For example, the detection model 661 may determine a current open rate for email messages received by devices running an Android operating system by calculating the ratio of delivery events to open events for a batch of email messages communicated to Android devices in an email campaign that is in running on the email communication network. The current open rate for the batch of email messages may be compared to a historical average open rate for email messages received by Android devices (e.g., the historical open rate for email messages received by Android devices observed for the one hundred most recently completed email campaigns). The detection model 661 may determine a rate of change in the open rate by determining the difference between the current open rate and the historical open rate. The rate of change determined by the current open rate (e.g., +0.9) may be compared to a detection threshold for Android devices (e.g., a 20% difference (+/−0.2), a difference of more than two standard deviations, and the like between the current and historical open rates). If the rate of change in the email open rate determined by the detection model 661 exceeds the detection threshold (e.g., is more than +/−0.2), the forensic discriminator 680 may determine the open events for the campaign running on the email communication network that were used to determine the current open rate are obfuscated. The obfuscated events identified by the forensic discriminator 680 may include events that were generated programmatically by an ISP instead of true open events that were generated by users receiving email messages. The detection threshold used by the detection models 661 may be one or more model coefficients or other model artifacts 652 determined by the training service 650. One or more campaign models 662 may predict an actual open rate for campaigns having obfuscated events. One or more user models 663 may identity the users targeted in the campaigns having obfuscated events that have the highest probability of generating true open events.

In various embodiments, the training service 650 may determine model coefficients for segments of email messages sent in individual campaigns 622A, . . . , 622N. The training service 650 may then combine and/or compare model coefficients for multiple campaigns 622A, . . . , 622N. The training service 650 may also combine the events and event metadata in event messages 624 for campaigns 622A, . . . , 622N having similar campaign configuration 626 to determine model coefficients for segments of email messages included in related campaigns (e.g., campaigns sent by brands in a particular industry, campaigns including a particular type of content, campaigns having a particular duration, campaigns sent at a particular time of the year, and the like).

The training service 650 may also combine one or more pieces of identity data 630 with the event data 620 to determine model coefficients for segments of email messages sent to users having one or more user attributes 636. For example, the training service 650 may filter the event data 620 by one or more user attributes 636 and one or more campaign configurations 626 to determine model coefficients for specific types of campaigns that target users with particular user attributes 636 (e.g., campaigns for clients in a particular industry that target user having a particular demographic, location, engagement tendencies, brand affinities, and the like). The training service 650 may determine model coefficients for multiple segments of users by filtering the event data 620 using different combinations user attributes, event metadata, event types, and campaign configurations 626. For example, the training service 650 may determine an open rate for emails targeting women ages 25-35 sent to Android devices by retrieving open and delivery events with event metadata including an Android operating system and a user identifier matching an identity record having user attributes 636 including woman and age 25-25.

The model coefficients determined by the training service 650 may be used by one or more econometric campaign models to predict accurate campaign level metrics for campaigns having obfuscated events. The campaign models 662 may include multiple open rate models that are each specific to a particular ISP, operating system, device type, and the like. The model coefficients of the open rate models may indicate threshold values of email open rates for email messages received by a particular ISP, operating system, and/or device type. The model coefficients of the open rate models may be determined based on the historical open rates observed for the ISPs, operating system, and/or device type over multiple campaigns that were completed over a predetermined time period (e.g., thousands of email campaigns completed in the past year, hundreds of email campaigns completed in the past week, and the like.) The open rate models may compare an open rate for a target sample to one or more of the open rate model coefficients to determine a degree of conformity between the open rate for the target sample and the historical open rate. For example, the open rate models may compare a target sample having obfuscated events and an unknown open rate to historical open rates for email messages received by the same ISP, operating system, and/or device type as the target sample. The open rate models may predict an open rate for the target sample by evaluating a degree of conformity between an overall historical open rates for all email messages received by the particular ISP, operating system, and/or device type over a predetermined time period and a campaign specific open rate for the email messages received by the particular ISP, operating system, and/or device type in campaigns that have one or more campaign configurations 626 in common with the target sample. The open rate model may determine a predicted open rate for the target sample by modifying the overall historical open rate based on degree of conformity for the campaign specific open rate. For example, if the degree of conformity of the campaign specific open rate is 20% less than the overall open rate for messages received by an ISP of the target sample, the open rate model may determine an predicted open rate for the target sample by reducing the overall open rate by 20%.

The open rate models may be trained to select one or more model coefficients based on a machine learned similarity between a target sample having obfuscated events and the training samples 642 used to determine the model coefficients. For example, the open rate models may determine an open rate for a target sample using model coefficients determined using a training sample 642 that includes campaigns 622A, . . . , 622N having similar campaign configurations 626 to the target sample. To determine the model coefficients that can provide the most accurate predicted open rate, the open rate models may generate a campaign relevance score for each of the model coefficients and the model coefficients with the highest campaign relevance score may be used to generate the predicted open rate.

In various embodiments, the campaign relevance score may be generated based on a comparison of the event metadata and/or campaign configurations 626 of the target sample having obfuscated events and the event metadata and/or campaign configurations 626 of the campaigns 622A, . . . , 622N included in the training sample 642 used to determine the model coefficients. The campaign relevance score may also be determined based on one or more pieces of identity data for users targeted in the target sample and users targeted by campaigns 622A, . . . , 622N used to determine the model coefficients. To generate the campaign relevance score, the training service 650 may aggregate the model features 646 for one or more training samples 642 having one or more pieces of event data 620 and/or identity data 630 in common with a target sample into a vector. For example, to generate a campaign relevance score for a target sample of email messages received by to a Yahoo ISP in a promotional campaign for an athletic clothing brand, the open rate models may calculate vectors for the target sample and training samples 642 that have campaign metadata including a Yahoo ISP, a promotional type campaign, and athletic cloth type. The open rate model may calculate one or more embeddings for the vectors by plotting each of the vectors in a trained multidimensional vector space (e.g., an embeddings space) that includes embeddings for a comprehensive set of campaign vectors having a diverse range of values for event metadata, campaign configurations 626, and identity data 630. The open rate models may generate a relevance score for the model coefficients based the coefficient embedding determined by aggregating the embedding values of the vectors for each campaign in the training sample 642 and the distance between the coefficient embedding and the target embedding calculated for the target sample. The open rate model determines the highest campaign relevance scores for the model coefficients having the most similar coefficient embedding to the target embedding (e.g., the smallest distance the between the vectors for of the training sample 642 and the target sample vector) and the lowest campaign relevant scores for model coefficients having the least similar coefficient and target embeddings.

The model coefficients having the highest campaign relevance scores are selected by the open rate model and used to determine predicted open rates for the target sample. In various embodiments, the open rate included in the model coefficient having the highest relevance score is determined to be the predicted open rate. The open rate models may also select multiple model coefficients (e.g., the three highest relevance scores or each coefficient with a relevance score above a relevance threshold (0.8), and the like) and average or otherwise combine the open rates of the selected model coefficients to determine a composite open rate. The open rate model may generate a predicted open rate based on the composite open rate for the selected model coefficients. The campaign models 662 may predict other campaign level metrics (e.g., click rate, conversion rate, and the like) for a target sample using the model coefficients for the other campaign level metrics by determining a relevance score for a selection of campaigns included in one or more training samples that are similar to the target sample and determining a predicted campaign level metric based on the campaign level metrics for the model coefficients having the highest relevance scores. The campaign models 662 may generate relevance scores for the model coefficients based on the unique campaign configurations 626, event metadata, and identity data 630 for each target sample having obfuscated events. The model coefficients and the relevance scores may also be updated by the training service 650 and campaign models 662, respectively, each time event data 620 and/or identity data 630 is received for new campaigns run by the publishing system.

The predicted campaign level metrics generated by the campaign models 662 may be used to determine a predicted number of true events for a target sample. For example, the open rate models may be used to determine a true number of email events for a target sample. To predict a true number of email open events, the forensic discriminator 680 may use the detection models 661 to determine a number of obfuscated events received for a particular campaign. For example, the forensic discriminator 680 may determine a total number of emails delivered by a target ISP (e.g., an ISP operating a proxy server that obfuscates open events by automatically opening and caches every delivered email message) by aggregating all delivered events received from the target ISP for a campaign. The forensics discriminator 680 may determine a number of obfuscated open events for the campaign and/or a portion of the campaign (e.g., a segment of email messages sent during a day or other predetermined time period, a segment of email messages sent to a group of users having one or more predetermined attributes, and the like) counting the number of open events for the campaign that were received from the target ISP subsequent to a delivery event. The open rate models may select one or more model coefficients based on a campaign relevance score as described above and determine a predicted open rate based on the selected model coefficients. The predicted open rate may be multiplied by the number of obfuscated open events and/or delivery events from the target ISP to determine a total number of email opens for the campaign.

In various embodiments, the machine learning models 660 may regularly (e.g., on a daily basis or continuously for any given period of time) predict campaign level metrics for batches of email messages sent by multiple campaigns running on the email communication network. For example, an open rate models may predict daily open rates and click rates for batches of emails received by target ISPs, target operating systems, and/or target device types that were previously identified by the forensic discriminator has originating obfuscated events. To determine accurate campaign level metrics for batches of messages sent in campaigns having obfuscated events, the training service 650 may determine model coefficients (e.g., daily open rates, daily click rates, and the like) for batches of email messages that were received by trusted ISPs, trusted operating systems, and/or trusted devices previously identified by the forensic discriminator as communicated true events. The training service may determine the model coefficients for trusted ISPs, operating systems, and/or device types for multiple campaigns having different event data 620 and/or identity data 630. The open rate models may determine predicted campaign level metrics for a target sample based on the model coefficients determined for batches of email messages sent in one or more campaigns having similar event metadata, campaign configurations 626, and/or identity data 630 to the target sample. The predicted campaign level metrics for target samples having obfuscated events may be used by the campaign optimization module 608 to improve the performance of the email communication network and/or increase the engagement metrics for one or more campaigns.

In various embodiments, the training service 650 may use the event data 620 and/or identity data 630 to train one or more random forest models. The random forest models may include multiple engagement models generated around various campaigns and audiences. The engagement models may indicate patterns of email opens, patterns of email clicks, and patterns of other interactions with email messages and other targeted content distributed in one or more campaigns. The engagement models may also indicate a degree of conformity to the patterns of interactions that are machine learned from the event data 620 and/or identity data 630. The engagement models may predict the probability that a user will open an email message by evaluating a degree of conformity between an email open probability, email click probability, and/or probability of another interaction with an email message of each user receiving an email message included in a target segment of messages relative to the patterns of engagement with email messages included in multiple campaigns by users in each of the campaign audiences.

Figure 7:
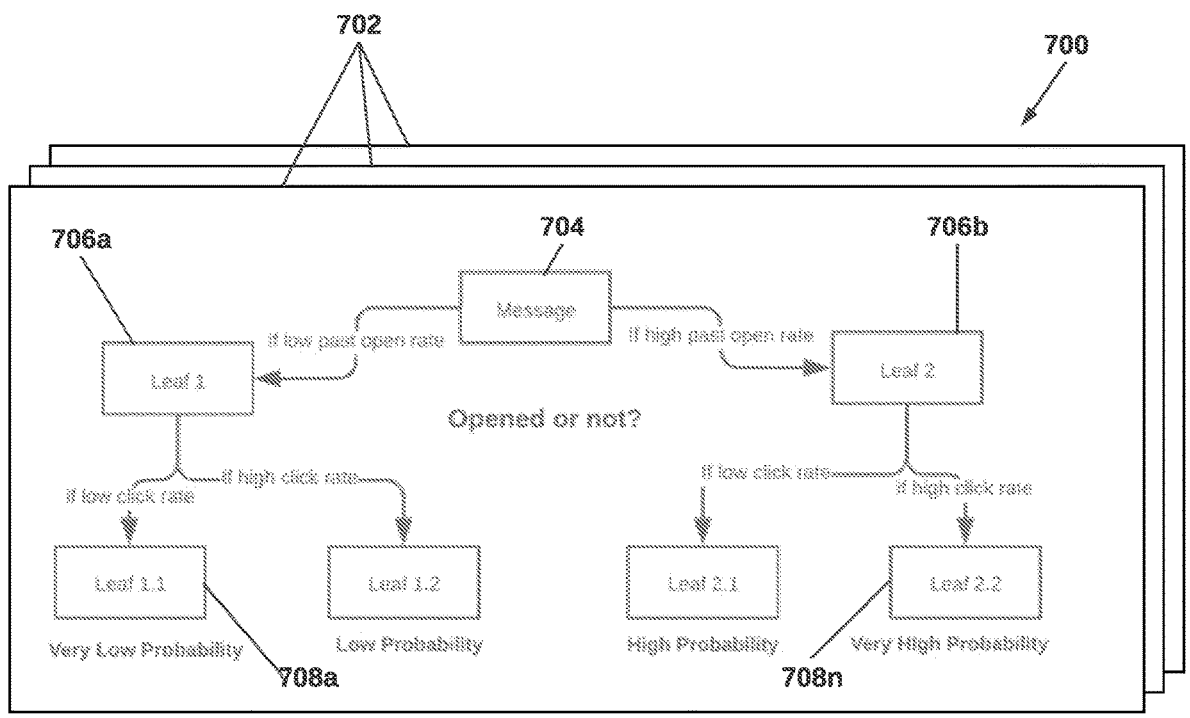
FIG. 7 illustrates more details of a random forest model, according to various embodiments described herein.

The training service 650 may also train one or more user models 663 that predict a likelihood a true open event (e.g., a true open event determined based on a predicted open rate determined by an open rate model) will be generated by a particular user. The user models 663 may include one or more neural networks, decision trees, random forest models, econometric models and the like. FIG. 7 illustrates an example random forest model 700 that predicts that probability an email message received by a particular user will be opened. The random forest model 700 may include multiple decision trees 702 that may each include one or more nodes. The random forest models 700 may include any number of decision trees 702 and/or nodes that may be arranged in one or more hierarchical structures. For example, the decision trees 702 may include a root node 704 as the topmost node in the decision tree and multiple internal nodes that are subnodes 706a, 706b below the root node. Each subnode 706a, 706b may contain a split with two or more paths and a split condition that is used to determine the correct path to take at each subnode. The nodes at the bottom of the decision tree 702 that do not contain a split may be leaf nodes 708a, . . . , 708n that correspond to an outcome for a decision tree 702. The outcomes from multiple decision trees 702 may be combined by the random forest model 700 to generate a prediction. For example, the outcomes from multiple decision trees may be combined using a majority voting scheme, probability averaging process, or ranked voting scheme that weights each outcome according to the predictive accuracy of the decision tree 702 on a validation dataset.

Referring back to FIG. 6, in various embodiments, multiple user models 663s may be used to predict the likelihood a user targeted in a campaign having obfuscated events generated a true open event. To train the user models 663 models, the training service 650 may select one or more campaign level metrics, pieces of event metadata, campaign configurations 626, and/or pieces of identity data 630 to include as model features 646 used to train the a user models 663. The features to include in the user models 663 may be selected using a feature selection model (e.g., a Lasso model, Ridge model, ElasticNet model, and the like). The feature selection model may reduce the dimensionality of the user models 663 and minimize overfitting by selecting the model features 646 that are useful and eliminating the useless or redundant features.

In various embodiments, the feature selection model may fit a cost function (e.g., a Lasso regression) on dataset of model features 646. One or more hyperparameters of the cost function may be trained by the training service 650 before fitting the model. For example, the hyperparameters may be trained using a cross validation approach that determines the average error values (e.g., mean squared error) in a multiple fold cross-validation (e.g., 5-folds cross-validation) for several values of each of the one or more hyperparameters within a predetermined range (e.g., incremental values from 0.1 to 10 with a 0.1 step). The trained hyperparameters may be stored as model artifacts 652. The feature selection model may use the test value of the hyperparameters having the lowest average error value (e.g., the trained hyperparameters) to fit the cost function to the dataset. In various embodiments, the feature selection model may select the model features 646 to include in the user models 663 by determining a cost coefficient for each of the model features 646 in the fit model. The value of the cost coefficient for each of the model features 646 may represent the importance of the feature to the prediction target (e.g., a probability an email message will be opened, a probability a user generate a true open event for an email message, and the like). The feature selection model may then eliminate model features 646 that are not important (e.g., have a cost coefficient of 0 or below a predetermined importance threshold) or redundant (e.g., are linearly correlated or similar to at least one other features). To eliminate redundant features, the feature selection model may shrink the coefficient of the less important correlated/similar feature (e.g., the feature having the lower cost coefficient value) to 0. Each model feature 646 having a non-zero cost coefficient may selected by the feature selection model to be included in the user models 663. A feature selection model may also be used to select model features for the other machine learning models using operations described above.

The selected features may be encoded by the encoder 648 to calculate encoded vectors that may be assembled into training datasets used to train one or more neural networks or other deep learning models. The selected features may also be used to construct one or more decision trees that are included in the random forest user models. The training service 650 may determine a subset of the selected features to include in the decision trees, how to split the trees (e.g., the threshold value for a model feature 646 used to split the subnodes in each tree), and a hierarchical arrangement of the subnodes in each tree and/or a hierarchical arrangement of decision trees in each random forest model based on the information gain of each decision tree on a training sample 642. The training sample 642 may include event data 620 and/or identity data 630 for campaigns 622A, . . . , 622N having known open events. To improve the accuracy of the user models 663, the one or more values for the event metadata and/or campaign configurations 626 for the campaigns 622A, . . . , 622N included in the training sample 642 may be similar to the campaign targeting the user include in the target sample. One or more values for user attributes 636 for the campaigns 622A, . . . , 622N include in the training sample 642 may also be similar to the user attributes of the user in the target sample. For example, the campaigns 622A, . . . , 622N included in the training sample 642 may have one or more campaign level metrics and/or pieces of event metadata (e.g., open rate, content type, sent date, receiving device operating system, and the like) in common with campaign targeting the user in the target sample. The campaign 622A, . . . , 622N included in the training sample 642 may also target users having demographics, location, user propensities, user affinities, and the like that are similar to the user included in the target sample.

To determine the optimal features, split, hierarchy of subnodes, and hierarchy of the decision trees, information gain is calculated for every feature at a range of splitting conditions (e.g., a predetermined range of splitting thresholds (0-10) with a predetermined step (0.1)). In various embodiments, the information gain may be determined using an entropy function, Gini-index, or other measure of model impurity. The features that provide the most information gain on the training sample may be incorporated into a decision tree. Each decision tree may select a predetermined amount of model features 646 to include as decision tree features in the decision tree and the features selected may be different for each prediction target. The decision tree features are arranged hierarchically in the decision tree based on the information gain so that the decision tree feature having the highest information gain is selected as the root feature chosen for the first split. The information gain for the remaining features is then determined for each possible iteration of the decision tree with the root feature selected as the first split. The remaining decision tree feature having the highest information gain is chosen for the second split. The information gain for each possible iteration of decision tree with the predetermined first and second splits is then determined and the remaining feature having the highest information gain is selected third split. This feature selection process continues until all of the decision tree features are incorporated into the decision tree. The splitting condition for each model feature (e.g., 0.7 for the open rate feature) may also be determined based on the information gain so that the value of the splitting condition for each model feature that provides the most information gain is used in the decision tree.

To determine train a random forest model to determine a prediction target (e.g., a probability that a user targeted in an email campaign will generate an open event), the training service 650 may construct multiple decision trees that each process a different subset of test values for the decision tree features. The subsets of test values included in the training data may include one original set of test values (e.g., event data 620 for email campaign C and user attributes 636 features for user B) that is unaltered and multiple bootstrapped test values that introduce randomness into the training process and help the random forest models account for each possible scenario and avoid overfitting the decision trees to the training data by reducing the variance of each individual decision tree. To generate the bootstrapped samples, repeated datapoints from the training data may be randomly selected and used to replace one or more of the original test values. Each decision tree may evaluate one of the subsets of test values and the outcomes generated by each of the decision trees may be aggregated based on a majority voting mechanism that counts the instances of each of the different predictions generated by the decision trees and selects the prediction having the most instances as the final predicted outcome. The predictions determined by each decision tree may also be combined using a weighted voting approach that multiplies each prediction by a trained and/or predetermined weight. For example, the prediction for the original set of test values may be multiplied by a weight of 0.7 and the predictions for all of the other subsets of test values may be multiplied by a smaller weight (e.g., 0.3) to emphasize the prediction generated for the original set of test values more in the final prediction. Probabilities determined by the decision trees (e.g., the probability user B will generate an open event for campaign D) may be aggregated by averaging the probabilities determined by each of the decision trees to provide the average probability as the final prediction.

Referring back to FIG. 7, the simplified random forest model 700 is one example of an user model that determines a probability an individual user will open an email message sent in a campaign. The random forest model 700 determines the probability a user will open a message based on a past open rate (e.g., historical open rate for email messages in previous campaigns calculated for the user) and the past click rate (e.g., a historical click rate for email messages in previous campaigns calculated for the user). At the first level of subnodes in the decision tree, the past open rate for the user is compared to an open rate splitting condition. If the past open rate for a user is below the open rate splitting condition (e.g., 0.4 corresponding to a 40% open rate), the path to to the low open probability subnode (leaf 1) at the left side of the decision tree 702 is taken. If the open rate for the user exceeds the open rate threshold (e.g., the user opens less than 40% of the email messages that are delivered), the path to the high probability subnode (leaf 2) at the right side of the decision tree 702 is taken. The second level of subnodes in the decision tree 702 determines an open probability for an individual user by comparing the user's past click rate to a click rate threshold (e.g., 0.3 corresponding to a 30% click rate). The decision tree 702 determines a very low predicted probability or low predicted probability for user split into the low probability subnode (leaf 1). If the past click rate for the user exceeds the click rate threshold, the decision tree 702 determines there is a "low probability" (e.g., a probability between 0.5 and 0.26) that the user has generated a true open event for the email message. If the past click rate for the user is below the click rate threshold, the decision tree 702 determines there is a "very low probability" (e.g, a probability of 0.25 or less) that the user has generated a true open event for the email message. Users split into the high open probability subnode (leaf 2) are determined to have a "high probability" or "very high probability" of generating a true open event for the email message. If the past click rate for the user is above the click rate threshold, the decision tree 702 determines there is a "very high probability" (e.g., a probability of 0.76 or more) that the user will generate a true open event for the email message. If the past click rate for the user is below the click rate threshold, the decision tree 702 determines there is a "high probability" (e.g, a probability between 0.51 and 0.75) that the user will generate a true open event for the email message.

The predictions from the simplified decision tree 702 may be combined with multiple predictions determined by other decision trees to generate a final prediction as described above. Classification predictions from multiple decision trees may be combined by a ranked voting approach. For example, if the prediction determined by two decision trees for a user is "high probability" and the prediction from one decision tree is "very high probability" the random forest model 700 will classify the user as having a "high probability" of generating a true open event for the email message. The random forest model 700 may evaluate each user targeted in a campaign individually to determine the users that are most likely to generate true open events for the email messages delivered during the campaign. The random forest model 700 may predict users classified in one or more classifications generated true open events (e.g., all users in "high probability" and "very high probability" or all users in just "very high probability"). The random forest model may also consider probabilities determined by the decision trees and/or values for model features 646 when making email open predictions. For example, the random forest model 700 may predict the sixty users split into the high open probability subnode (leaf 2) that have the highest click rates have the highest probability of generating true open events. The user models may select a number of users having the highest open probabilities that matches a number of predicted open events (e.g., a number of open events determined by multiplying the number of delivery events by a predicted open rate determined by a campaign model) for a target sample to identify the users targeted in a campaign having obfuscated email events that are the most likely to generate the expected number of true open events for the campaign.

Referring back to FIG. 6, in various embodiments, multiple machine learning models 660 may be used to determine the individual users that are most likely to generate true open events for a campaign having obfuscated events. For example, a campaign model 662 may determine a predicted open rate that indicates a campaign received 100 obfuscated email open events. A user model 663 may identify the 100 user targeted in the campaign that have the highest probability of generating the open events (i.e., opening the email messages). A campaign model 662 may determine a predicted open rate for a target sample having obfuscated events. The campaign model 662 may use the predicted open rate to determine a total number of email opens for the target sample by, for example, multiplying a total number of delivery events observed for the target sample by the predicted open rate. A user model 663 may predict the individual users in the campaign that have the highest probability of generating the expected number true open events (e.g., the number of true open events determined by the campaign model 662). In various embodiments, the user model 663 may determine an email open probability for each user targeted in the target sample. The email open probabilities may be compared to an open probability threshold and users that have a probability that exceeds the threshold probability may be determined to have opened the email message. The user models 663 may also determine the users with the highest open probability scores have opened the email messages. For example, users targeted in the target sample may be ranked based on their predicted open probabilities and the users with the highest rankings may be predicted to have the highest probability of generating a true open event.

The training service 650 may also train one or more neural networks or other machine learning models 660 that use deep learning techniques to determine predictions. The neural networks may be trained using training datasets including one or more encoded vectors calculated by the encoder 648. The encoded vectors may be representative of multiple model features 646 included in training samples 642. For example, a neural network implementation of a detection model 661 and/or campaign model 662 may be trained using encoded vectors that are representative of model features 646 that include one or more pieces of event metadata and/or one or more campaign configurations 626 for multiple campaigns 622A, . . . , 622N. A neural network implementation of a user model 663 may be trained using encoded vectors that are representative of model features 646 that include one or more pieces of event metadata, one or more campaign configurations 626, and/or one or more user attributes 636 for one or more campaigns and/or users.

Figure 8:
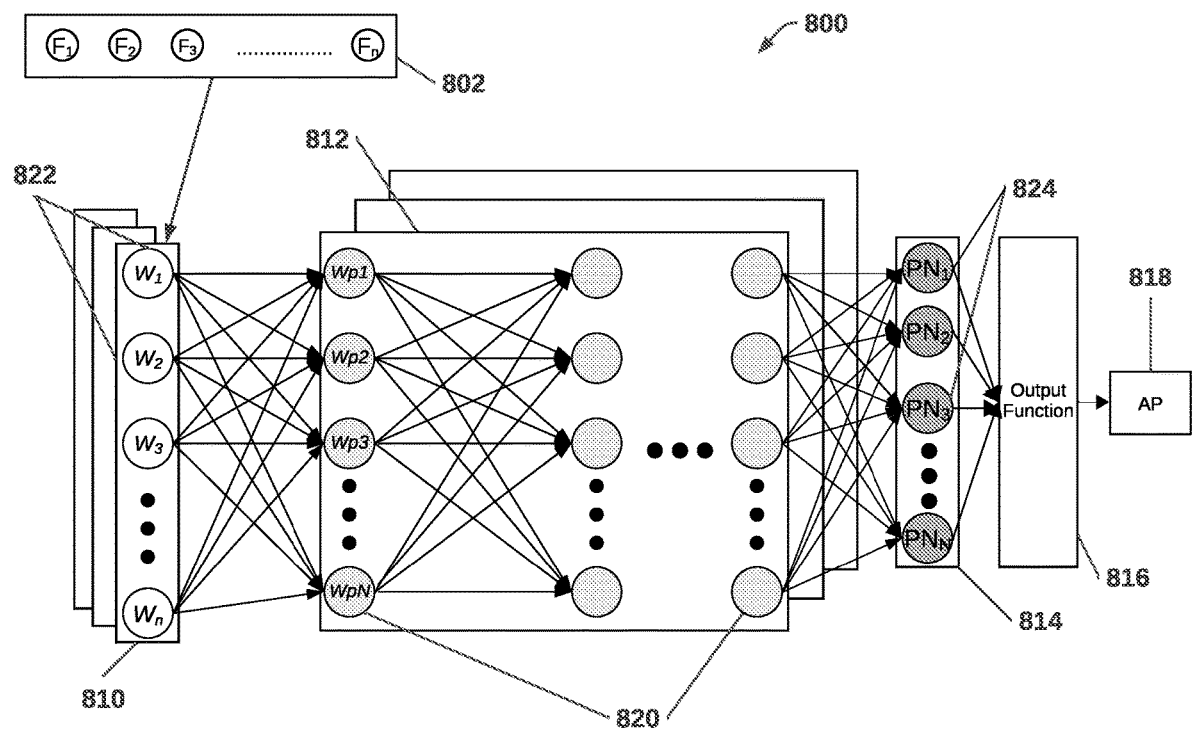
FIG. 8 illustrates more details of a neural network, according to various embodiments described herein.

FIG. 8 illustrates more details of a neural network 800 architecture for an example neural network implementation of one or more of the machine learning models. The neural network may include an input layer 810, multiple hidden layers 812, and an output layer 814. Each layer may include one or more nodes. In various embodiments the input layer nodes 822 may correspond to the encoded model features in the encoded vector 802 (e.g., the n-dimension representation of the selected pieces of event metadata, campaign configurations, and/or user attributes). The output layer 814 may contain multiple output layer nodes 824 that provides numerical predictions (e.g., obfuscation probabilities, campaign level metrics, open probabilities, and the like) on a normalized (e.g., between 0 to 1) or continuous scale. An output function 818 may combine the numerical predictions ($PN_1, \ldots, PN_N$) determined by each of the output layer nodes 824 into an aggregate prediction (AP) 818.

During training, the training service may initialize the weights for each of the parameters (Wp1, . . . , WpN) in each of nodes included in the hidden layers 812 using an initializer (e.g., a normal initializer that assigns random values for weights in a normal distribution). In various embodiments, initializing the nodes of the hidden layers 812 may involve determining at least one initial value of one or more weights for hundreds and/or thousands of trainable parameters. An activation function (e.g., a rectified linear unit (ReLU) activation function) is then applied to the weighted sum output from each hidden layer node 820 to generate the output for the node. A second activation function (e.g., a sigmoid activation function, linear activation function, and the like) may be selected for the output layer and used to determine a numerical prediction for each output layer node 824 from the weighted sums output by each of the hidden layers 812. For classification tasks (e.g., classifying if an event is a true event or an obfuscated event), an output function 816 may combine the numerical probabilities from the output layer nodes 824 to generate an aggregate probability. The output function may then compare the aggregate probability to a classification threshold to determine classify a target sample. For example, message events having aggregate probabilities that meet or exceed the detection threshold of a detection model will be determined to be obfuscated events and message events having aggregate probabilities that are below the detection threshold will be determined to be true events.

In various embodiments, the training service may train a neural network for predicting a probability a user will open an email message a training dataset including encoded vectors for multiple email messages. The encoded vectors including one or more campaign configurations (e.g., campaign type) and one or more pieces of event metadata (e.g., message location and or message IP address) for one or more campaigns that sent the email messages, one or more user attributes (e.g., user past open rate, user past click rates, user past times between open events and click events, user topic propensities, user brand affinities, user and/or user product affinities) for one or more users targeted by the one or more campaigns, and known open events generated for the email messages. During training, the deep neural network may learn the patterns of model features in the training dataset that are indicative and not indicative of the probability a user will open an email message.

To train the neural network, the training service initializes the weights of each node in the hidden layers 812 by determining an initial value for each of the weights. The initial model determines an numerical probability for each email message in the training dataset that indicates the probability a user having the user attributes in the encoded vector will generate an open event for the email message. The training service determines a loss function (e.g., binary cross entropy loss, hinge loss, mean absolute error, and the like) for the model and determines an error value (e.g., a difference between the predicted output and the known output) for the loss function based on the numerical probabilities determined by the initial model and the known events for the email messages. The loss function may be determined for each encoded vector individually and may compare the predicted open probabilities for each email message to the known open events.

The training service may determine a gradient function (e.g., a gradient descent algorithm) that backpropagates the error from the output layer 814 back through the hidden layers 812 of the model by calculating a loss gradient for each weight. For example, the loss gradients may be partial derivatives of the loss function with respect to each weight to determine the portion of the error value attributed to each weight in the hidden layer 812. The training service may adjust the weights of the hidden layer nodes 820 in the direction of the negative gradient by multiplying the current value for each weight in the hidden layer 812 by a learning rate (e.g., 0.1 or any other predetermined step size) and subtracting the result from the gradient values to determine the updated weight values for each hidden layer node 820. The training service may determine an updated model by setting the weight for each hidden layer node 820 to the updated weight values.

During each training epoch, the training service may retrain the updated model by rescoring each of the email messages in the training dataset based on the updated weights and determining new numerical probabilities (e.g., open probabilities) for each email message. An error value may be calculated for the updated model using the loss function and the gradient function may backpropagate the error back through the hidden layers 812 by adjusting the weights for each hidden layer node 820 based on the loss gradients for each weight. The next iteration of the neural network be retrained using the loss function and gradient functions as described above. The training service may continue to retrain new iterations of the neural networks to improve the performance of the machine learning models.

Referring back to FIG. 6, after a predetermined number of training epochs, a validation service 664 may validate the model by performing an assessment that determines the prediction accuracy of the trained neural network on a validation set of encoded vectors determined for a set of email messages that were withheld from the training dataset. If the prediction accuracy of the model meets or exceeds a performance threshold, the neural network model may be deployed to production and used to determine open probabilities for input email messages. If the prediction accuracy of the neural network model is below a performance threshold, the neural network models may be retrained by the training service until the desired level of performance is achieved (e.g., the prediction accuracy rate for the model meets or exceeds the performance threshold).

To continuously improve the performance of the models over time, the neural network models may be retrained by the training service 650 when new event data 620 is received by the email server. For example, the neural network models may be retrained on a different or larger training dataset that includes model features determined from the new event data 620 (e.g., new or updated identity records). The training service 650 may also modify the hidden layers of the model by adding, subtracting, or modifying one or more hidden layer nodes 820. The training service 650 may also modify one or more hyperparameters used to train the neural network implementation of the machine learning models 660. For example, the training service may modify the loss function, the gradient function, the step size or number of training epochs, and the like based on new or updated event data 620 to improve model performance. For example, additional model features corresponding to new or updated event metadata fields of new event messages 624 may be appended to the encoded vectors that are input into the neural network models during training. The step size and/or the number of training epochs may also be increased or reduced to improve model performance and/or improve training efficiency. The neural network implementations of the machine learning models 660 may also determine open probabilities for new campaigns having obfuscated open events to improve one or more engagement metrics for email campaigns.

In various embodiments, a validation service 664 may evaluate the performance of the one or more machine learning models 660. For example, the validation service 664 may validate one or more prediction of the user models 663 based on updated engagement histories. The validation service 664 may receive new engagement events that are added to identity records 632A, . . . , 632N for users that were predicted by the user models 663 to have generated a true open event for the campaign. The validation service 664 may parse the updated engagement histories to identify one or more engagement events that are subsequent to a time stamp for an obfuscated open event that indicate the user opened the email message. The validation service 664 may use the identified engagement event (e.g., a conversion event for a product included in the subject matter of an email message) to confirm the user actually opened the email message and generated a true email open event that was obfuscated by the ISP. The validation service 664 may use the identified engagement events that confirm one or more predictions of the user models to improve the accuracy of the user models. For example, the validation service 664 may perform an reinforcement learning process that rewards the user model 663 for making an accurate prediction. The validation service 664 may also determine a training dataset that email messages having confirmed open events. For example, the validation service 664 user the encoder 648 to determine an encoded vector for each email message having a confirmed open event. The encoded vector may include at least a portion of the event data 620 for the email message, the identity data for the user receiving the message, and the confirmed open event. The training service may aggregate the encoded vectors determined by the validation service 664 into a training dataset that is used to retrain one or more user models 663 to determine an updated user model 663 having an improved performance.

The validation service 664 may also validate one or more predictions of campaign models 662. For example, the validation service 664 may compare the predicted open rates generated by a campaign model 662 to one or more known open rates. The validation service 664 may compare the predicted open rate for a batch of email messages in an email campaign having obfuscated events to an observed open rate for the other email messages in the campaign that do not have obfuscated events. The validation service 664 may determine the difference between the predicted open rate and the observed open rate and compare the difference to an accuracy threshold (e.g., plus or minus 25% of the observed open rate). If the difference between the predicted open rate (e.g., 0.57) and the known open rate (e.g., 0.51) is within the accuracy threshold (e.g., +/−0.13), the open rate model may be deployed to production and used to predict open rates for new campaigns having obfuscated email events. If the difference between the predicted open rate and the known open rate exceeds the accuracy threshold, the open rate models may be retrained by adjusting the model coefficients used to determine the predicted open rates and the retrained open rate model may be retested by the validation service 664. The open rate model may be retrained and retested until the open rate model can determine a predicted open rate for campaigns having obfuscated events that is within the desired level of similarity to the observed open rate for the other messages in the campaign.

The validation service 664 may also determine the predictive power of one or more random forest implementations of the user models 663 by testing the performance of the random forest models on a validation set of email messages having known open outcomes. For example, the performance of the random forest model shown in FIG. 7 may be tested on a validation set including 100 email messages that generated 30 open events. Determine the accuracy of open probabilities generated by the random forest model, open probabilities for a test sample of users that received the 100 email messages may be determined. The users determined to have a "very high probability" of generating an open event may be compared to the user generating known open events to determine the number of users that were accurately classified by the model. The difference between the accurately classified users and total number of users generating known open events may be compared to an accuracy threshold (e.g., 15% of the total open events). If the difference (e.g., 3) is within the accuracy threshold (4.5), the user models 663 may use the random forest model implementation to determine open probabilities for users receiving email messages having obfuscated events. If the difference exceeds the accuracy threshold, the model features, split coefficients, and/or hierarchy of the decision trees included in the random forest model may be modified by the training service 650 and the random forest model may be retested by the validation service 664. The random forest model may be modified and retested until the model accurately predicts a sufficient number of users that generated true open events.

The prediction accuracy of the decision trees determined by the validation service 664 may also be used to determine the weight for the predictions generated by each decision tree in random forest model embodiments having a weighted voting scheme. The prediction accuracy for an individual decision tree on the validation set of 100 email messages (27 of 30 or 90%) may be used to determine the weight for the prediction generated by the decision tree. For example, a decision tree with a 90% prediction accuracy on the validation set may be given a weight of 0.9, a decision tree with a 30% prediction accuracy may be given a weight of 0.3, and a decision tree with a 50% prediction accuracy may be given a weight of 0.5. A random forest model with a weighted voting scheme would predict a user is going to open an email message based on a "email open" outcome from the first decision tree even if the second that third decision trees both generated a "no email open" outcome for the user.

A campaign optimization module 608 may use the predictions generated by the one or more machine learning models 660 to improve the performance and efficiency of email communication networks. The campaign optimization module 608 may also improve one or more engagement metrics for email campaigns by reconfiguring the campaign configurations 626 to redistribute the targeted content from a campaign that produced a high predicted open rate. For example, the campaign optimization module 608 may configure the campaign configuration 626 to running one or more subsequent campaigns on the email communication network or other networked communication system. The subsequent campaigns may redistribute targeted content generating a high predicted open rate by, for example, sending email messages including the targeted content, using a DSP to obtain content placement and publish the targeted content in the obtain placements, and/or incorporating the targeted content into one or more new media campaigns. The campaign optimization module 608 may also redistribute targeted content to the users having a predicted high probability of generating open events. For example, the users predicted to open email messages in one or more media campaigns may be included in an audience for a new media campaign that distributes targeted media that is identical to or similar to the targeted media that generated a high predicted open probability for the user.

Figure 9:
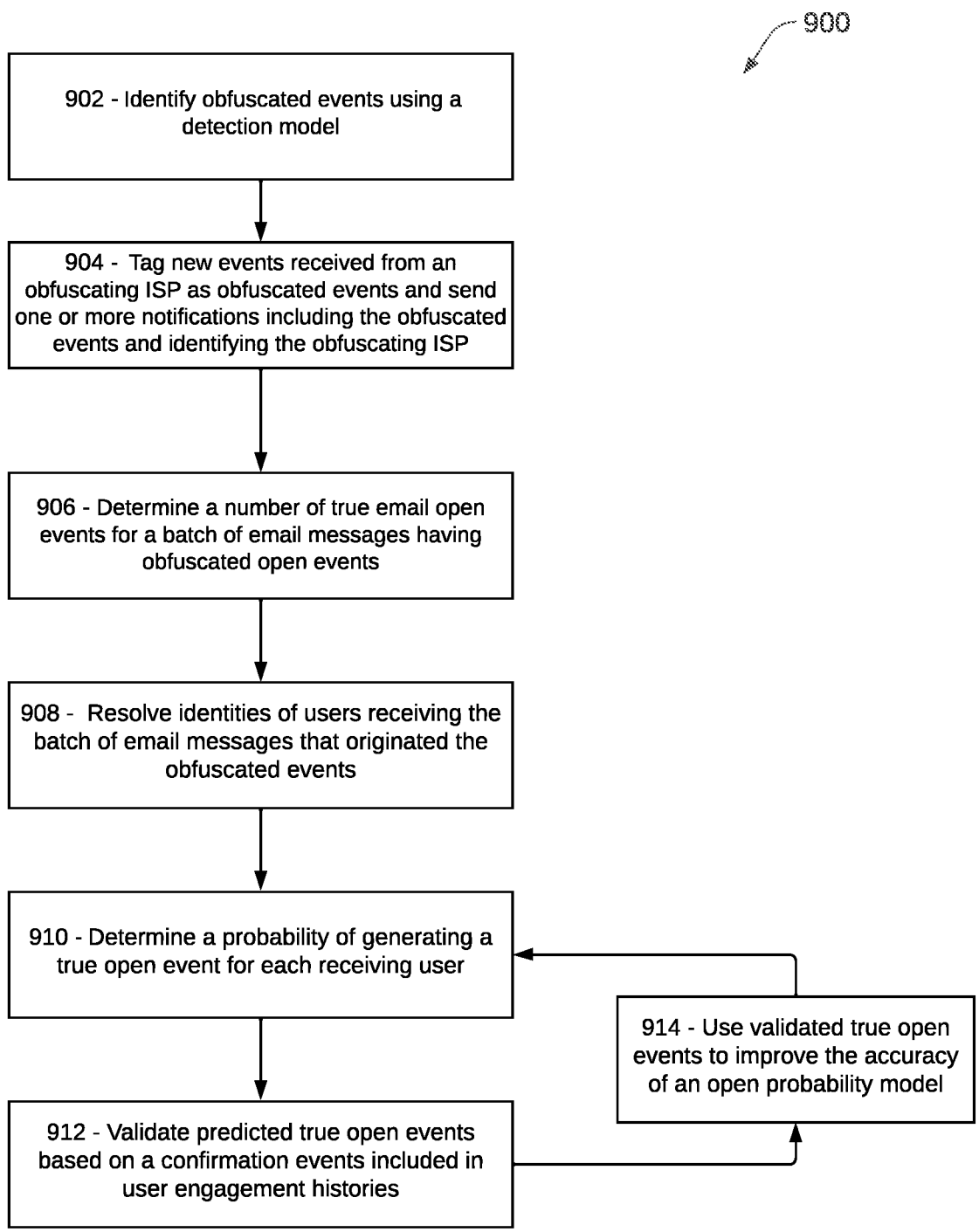
FIG. 9 is a flow chart depicting operations in a method, according to various embodiments described herein.

Some examples of the technology disclosed herein include methods. For example, FIG. 9 illustrates a process 900 for deobfuscating email events received from ISPs. At step 902 a forensic discriminator identifies one or more obfuscated events received from an ISP using a detection model. The detection model may be a neural network trained on a training dataset including multiple encoded vectors that each are representative of a portion of the events metadata and/or campaign features of a campaign. A portion of the encoded vectors included in the training dataset for the detection model may be representative of the events metadata and/or campaign features of campaigns having known true obfuscated events. A portion of the encoded vectors included in the training dataset of the detection model be also be representative of the events metadata and campaign features of campaigns having known obfuscated events. The forensic discriminator may also identify obfuscated events based on a rate of change for open rates or other campaign level metrics of one or more campaigns determined by the detection model. The forensic discriminator may determine an ISP that sent the identified obfuscated events based on the event metadata of the event messages including the obfuscated events. ISPs that are determined by be sending obfuscated events may be labeled as obfuscating ISPs by the forensic discriminator.

At step 904, the forensic discriminator may tag new events received from the obfuscating ISP as obfuscated events and send one or more notifications that include the obfuscated event and identity the obfuscating ISP. For example, the forensic discriminator may tag the obfuscated events by adding an identifier to the event metadata that identifies that event as inaccurate. The notifications sent by the forensic discriminator may include an error notification or other message sent to support interface (e.g., a contact us or support email address) operated by the ISP that reports that obfuscated event to the ISP to notify the ISP of the error that occurred in their event reporting system and other event metadata (e.g., time stamp for the obfuscated event, operating system for the device sending the event, IP address of the event, location of the event, and the like) to help the ISP determine the component of the event reporting system and/or email delivery system that originated the error that is causing the events to be obfuscated. The ISP may use the error notification to improve the performance of the email communication network by enabling the ISP to more rapidly determine the source of the error and more efficiently fix the error.

The notifications sent by the forensic discriminator may also include an obfuscation report sent to the publication system. The obfuscation report may list the obfuscated events identified by the forensic discriminator, the campaigns having one or more obfuscated events, and the ISPs generating the obfuscated events. The obfuscation report may also include an option to cancel the campaign which, if selected, modify the campaign configurations and cause the email communication network to stop communicating email messages scheduled to be sent in the campaign. The obfuscation report may be included in on one or more UIs displayed on a client device by the publication system.

Multiple machine learning models may be used to deobfuscate the obfuscated events by determining actual campaign level metrics and users with the highest probability of generating true open events for the campaign having obfuscated events. At step 906, a campaign model may determine a number of true email open events for the batch of email messages having obfuscated open events. The campaign model may determine the number of true email open events based on a predicted actual open rate for the campaign including the batch of email messages. The campaign model may use an open rate model to determine the actual open rate for the campaign. In various embodiments, the open rate model may be implemented as a neural network trained on a training dataset including multiple encoded vectors that each are representative of a portion of the events metadata and/or campaign features of a campaign having a known open rate. The open rate model may also determine the actual open rate using one or more open rates or other model coefficients determined for campaigns having similar campaign configurations to the campaign having the obfuscated events. The campaign model may multiply the number of obfuscated open events by the predicted actual open rate to determine the number of true open events for the batch of emails.

At step 908, identities of users receiving the batch of email messages that originate the obfuscated events may be resolved. To resolve the user identities, a user identifier may be extracted from the event metadata for the event messaging including the obfuscated event. A user identifier may also be extracted from an email message (e.g., a receipt address field in the message) communicated to an ISP by an MTA that has a time stamp earlier than the time stamp for the obfuscated event received from the ISP in response to the communicated email message. An email server receiving the event message having the obfuscated event may communicate the user identifier to a publication system that may use the user identifier to resolve an identity of a user in a graph database, identity space, data cloud, CDP, or other database or datastore. For example, the publication system may resolve the identity of a user receiving the email message by matching the extracted user identifier with one or more user IDs included in an identity record. The user attributes included in the identity records for the resolved identities may be transmitted to the data deobfuscation layer for determining open probabilities for the users receiving the email messages that originated the obfuscated open events.

At step 910, a user model may determine the users that generated true open events for the batch of email messages by determining a probability of generating a true open event for user receiving one of the batch of email messages. The user model may determine the open probabilities for each user using an open probability model. The user model may rank the users based on the open probabilities for each user and select a number of users generating true open events based on each user's ranking and a number of true open events for a batch of email messages (e.g., a number of true open events determined based on a predicted open rate for a campaign including the batch of email messages). For example, if the campaign model determines the batch of email messages generated 100 true open events, the user model may select the users ranked in positions 1-100 (e.g., the users having the 100 highest open probabilities).

In various embodiments, the open probability model may be implemented as a neural network trained on a training dataset including multiple encoded vectors that each are representative of a portion of the events metadata and/or campaign features of a campaign sending an email message a specific user and/or a portion of the user attributes for the user receiving the email message. A portion of the encoded vectors included in the training dataset for the open probability model may be representative of user attributes for users that generated known open events. A portion of the encoded vectors included in the training dataset of the open probability model be also be representative of the user attributes for users known to not generate open events. The open probability model may also be implanted as one or more of the random forest models described above.

At step 912, a validation service may validate true open events predicted by the user models using downstream confirmation events included in user engagement histories. The downstream confirmation events may include one or more engagement events (e.g., clicks, open, replies, unsubscribes, conversations, and the like) that have time stamp data subsequent to the time stamp data of obfuscated open event. The validation service may obtain updated identity data for each user receiving an email included in the batch of emails having obfuscated events. The updated identity data may include engagement histories for the users that have new engagement events that occurred after the obfuscated open event was generated. The new engagement events may include downstream engagement events that are related to the open event (e.g., include the same brand, product, channel, and like). The validation service may parse the new engagement events to identify a confirmation event that confirms the user opened the email message. For example, the confirmation event may be a conversion event purchasing a product mentioned in the email message, a reply event that sent a reply message to the email message, an unsubscribe event that unsubscribed the user from a mailing list that originated the email message, a web browsing event indicating a user searched for a product included in the email message and/or navigated to a webpage operated by the brand that sent the email message, and the like.

Each time a predicted true open event is validated by the validation service, the validation service may use the validated true open events to improve the accuracy of the open probability model, at step 914. For example, the validation service may perform a reinforcement learning process that provides a reward to the open probability model to reinforce the weights of the neural network used to determine the open probabilities for the predicted true open event. The validation service may also calculate an encoded vector for each validated true open event that includes a portion of the user attributes for the user generating the true open event and a portion of the event metadata and/or campaign configurations for the campaign that sent the email message originating the true open event. Each encoded vector may be added to a training dataset that is used to periodically retrain the open probability model to continuously improve its performance.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable user electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An email server for deobfuscating email events comprising:
   one or more processors; and
   a memory storing instructions that, when executed by at least one processor in the one or more processors, cause the at least one processor to perform at least the following operations:
   transmit multiple email messages of an email campaign to multiple internet service providers (ISPs), each email message transmitted by a mail transfer agent (MTA) in communication with one or more nodes hosted by one of the multiple ISPs;
   determine a batch of email messages having obfuscated open events;
   determine a predicted open rate for the email campaign including the batch of emails using an open rate model;
   determine one or more true email open events for the batch of email messages based on the predicted open rate for the campaign;
   transmit corrected event data for the campaign to an application server in communication with the email server, the corrected event data including the one or more true email open events;
   resolve a unique identifier associated with each user that received at least one of the email messages in the batch of email messages;
   generate a set of encoded vectors for a training sample of email campaigns, each encoded vector in the set of encoded vectors representative of one or more pieces of event data, one or more campaign configurations, and one or more user attributes associated with an email campaign in the training sample, the one or more pieces of event data identified from one or more event messages received from an ISP in response to email messages sent to the ISP by an MTA;
   aggregate the encoded vectors generated for the training sample into one or more training datasets;
   train a user model using the one or more training datasets;
   determine an open probability for each of the users using the user model;
   determine a predicted true open event based on the open probabilities for each user, the predicted true open event identifying a user predicted to have generated one of the true email open events; and
   validate the predicted true open event based on a confirmation event recorded in an engagement history of the user.

2. The email server of claim 1, wherein the processor is further configured to identify the one or more obfuscated open events based on a piece of metadata extracted from an email event message received from the ISP.

3. The email server of claim 1, wherein the at least one-user is included in an audience identified based on one or more targeting parameters included in a set of campaign configurations for the email campaign.

4. The email server of claim 3, wherein the training sample includes at least one email campaign targeting a group of users having one or more user attributes that are similar to the audience.

5. The email server of claim 4, wherein the one or more user attributes include at least one of socio-demographic data, email open data, and browsing data for the group of users.

6. The email server of claim 1, wherein the user model is at least one of a neural network and a random forest model.

7. The email server of claim 1, wherein the user model includes a random forest model having multiple decision trees.

8. The email server of claim 7, wherein each decision tree of the multiple decision trees determines an open probability and the random forest model determines an aggregate open probability by combining the open probabilities from each of the multiple decision trees using a ranked voting approach.

9. The email server of claim 1, wherein the processor is further configured to transmit corrected events data to a demand side platform included in an application server, wherein the demand side platform uses the corrected events data to optimize a media campaign.

10. The email server of claim 1, wherein one or more model features used to train the open rate model include at least one of one or more email open events, one or more email open rates, one or more email click events, one or more email click rates, and an average time difference between at least one of the one or more email open events and at least one of the one or more email click events.

11. A method for deobfuscating email events received from an internet service provider (ISP), the method comprising:
   transmitting multiple email messages of an email campaign to multiple internet service providers (ISPs), each email message transmitted by a mail transfer agent (MTA) in communication with one or more nodes hosted by one of the multiple ISPs;
   determining a batch of email messages having obfuscated open events;
   determining a predicted open rate for the email campaign including the batch of emails using an open rate model;
   determining one or more true email open events for the batch of email messages based on the predicted open rate for the campaign;
   transmitting corrected event data for the campaign to an application server in communication with the email server, the corrected event data including the one or more true email open events;

resolving a unique identifier associated with each user that received at least one of the email messages in the batch of email messages;

generating a set of encoded vectors for a training sample of email campaigns, each encoded vector in the set of encoded vectors representative of one or more pieces of event data, one or more campaign configurations, and one or more user attributes associated with an email campaign in the training sample, the one or more pieces of event data identified from one or more event messages received from an ISP in response to email messages sent to the ISP by an MTA;

aggregating the encoded vectors generated for the training sample into one or more training datasets;

training a user model using the one or more training datasets;

determining an open probability for each of the users using the user model;

determining a predicted true open event based on the open probabilities for each user, the predicted true open event identifying a user predicted to have generated one of the true email open events; and validating the predicted true open event based on a confirmation event recorded in an engagement history of the user.

12. The method of claim 11, wherein the one or more obfuscated open events are identified based on a piece of metadata extracted from an email event message received from the ISP.

13. The method of claim 11, wherein the user is included in an audience identified based on one or more targeting parameters included in a set of campaign configurations for the email campaign.

14. The method of claim 13, wherein the training sample includes at least one email campaign targeting a group of users having one or more user attributes that are similar to the audience.

15. The method of claim 14, wherein the one or more user attributes include at least one of socio-demographic data, email open data, and browsing data for the group of users.

16. The method of claim 11, wherein the user model is at least one of a neural network and a random forest model.

17. The method of claim 11, wherein the user model includes a random forest model having multiple decision trees.

18. The method of claim 17, wherein each decision tree of the multiple decision trees determines an open probability and the random forest model determines an aggregate open probability by combining the open probabilities from each of the multiple decision trees using a ranked voting approach.

19. The method of claim 11, further comprising transmitting corrected events data to a demand side platform included in an application server, wherein the demand side platform uses the corrected events data to optimize a media campaign.

20. The method of claim 11, wherein one or more model features used to train the open rate model include at least one of one or more email open events, one or more email open rates, one or more email click events, one or more email click rates, and an average time difference between at least one of the one or more email open events and at least one of the one or more email click events.

* * * * *